(12) United States Patent
Machado et al.

(10) Patent No.: US 11,844,050 B2
(45) Date of Patent: Dec. 12, 2023

(54) INSTALLATION AND ACTIVATION OF RF COMMUNICATION DEVICES FOR WIRELESS NETWORKS

(71) Applicant: Pivotal Commware, Inc., Kirkland, WA (US)

(72) Inventors: Melroy Machado, Bothell, WA (US); Alexander Remley Katko, Seattle, WA (US); Daniel Lee Schaeffer, Seattle, WA (US); Juan Pablo Olivo González, Bothell, WA (US); Soyong Hong, Seattle, WA (US); Mersad Cavcic, Kirkland, WA (US)

(73) Assignee: Pivotal Commware, Inc., Bothell, WA (US)

( * ) Notice: Subject to any disclaimer, the term of this patent is extended or adjusted under 35 U.S.C. 154(b) by 0 days.

(21) Appl. No.: 17/708,757

(22) Filed: Mar. 30, 2022

(65) Prior Publication Data

US 2022/0369295 A1 Nov. 17, 2022

Related U.S. Application Data

(63) Continuation of application No. 17/469,694, filed on Sep. 8, 2021, now Pat. No. 11,297,606.
(Continued)

(51) Int. Cl.
*H04W 72/00* (2023.01)
*H04W 72/04* (2023.01)

(52) U.S. Cl.
CPC .................. *H04W 72/04* (2013.01)

(58) Field of Classification Search
CPC ..... H04L 41/0803; H04L 67/10; H04L 41/04; H04L 41/085; H04L 41/12; H04W 84/18; H04W 76/10; H04W 72/04; H04W 16/10
See application file for complete search history.

(56) References Cited

U.S. PATENT DOCUMENTS

| 2,131,108 | A | 9/1938 | Lindenblad |
| 4,464,663 | A | 8/1984 | Lalezari et al. |

(Continued)

FOREIGN PATENT DOCUMENTS

| CN | 102948089 A | 2/2013 |
| CN | 103700951 A | 4/2014 |

(Continued)

OTHER PUBLICATIONS

U.S. Appl. No. 17/469,694, filed Sep. 8, 2021.
(Continued)

*Primary Examiner* — Shantell L Heiber
(74) *Attorney, Agent, or Firm* — John W. Branch; Branch Partners PLLC

(57) ABSTRACT

An application for a user such as a professional installer and/or a customer to install and activate an RF communication device at a user's location such a customer's premises. The application provides for automating at least a portion of the actions necessary to install the RF communication device and/or user equipment devices; and subsequently activate wireless RF communication between the RF communication device and a remote base station associated with a wireless carrier. Also, video presentations along with written tutorials, manuals, and instructions, may be provided to answer questions and provide directions to the user in the installation and/or activation process for the RF communication device and/or user equipment devices.

20 Claims, 21 Drawing Sheets

Related U.S. Application Data

(60) Provisional application No. 63/075,752, filed on Sep. 8, 2020.

(56) References Cited

U.S. PATENT DOCUMENTS

| | | | |
|---|---|---|---|
| 6,133,880 | A | 10/2000 | Grangeat et al. |
| 6,150,987 | A | 11/2000 | Sole et al. |
| 6,529,745 | B1 | 3/2003 | Fukagawa et al. |
| 6,680,923 | B1 | 1/2004 | Leon |
| 7,084,815 | B2 | 8/2006 | Phillips et al. |
| 7,205,949 | B2 | 4/2007 | Turner |
| 9,356,356 | B2 | 5/2016 | Chang et al. |
| 9,385,435 | B2 | 7/2016 | Bily et al. |
| 9,450,310 | B2 | 9/2016 | Bily et al. |
| 9,551,785 | B1 | 1/2017 | Geer |
| 9,608,314 | B1 | 3/2017 | Kwon et al. |
| 9,635,456 | B2 | 4/2017 | Fenichel |
| 9,711,852 | B2 | 7/2017 | Chen et al. |
| 9,806,414 | B2 | 10/2017 | Chen et al. |
| 9,806,415 | B2 | 10/2017 | Chen et al. |
| 9,806,416 | B2 | 10/2017 | Chen et al. |
| 9,812,779 | B2 | 11/2017 | Chen et al. |
| 9,813,141 | B1 | 11/2017 | Marupaduga et al. |
| 9,936,365 | B1* | 4/2018 | Elam ............... G01S 5/0221 |
| 9,955,301 | B2 | 4/2018 | Markhovsky et al. |
| 10,033,109 | B1 | 7/2018 | Gummalla et al. |
| 10,225,760 | B1 | 3/2019 | Black |
| 10,277,338 | B2 | 4/2019 | Reial et al. |
| 10,313,894 | B1 | 6/2019 | Desclos et al. |
| 10,324,158 | B2 | 6/2019 | Wang et al. |
| 10,431,899 | B2 | 10/2019 | Bily et al. |
| 10,468,767 | B1 | 11/2019 | McCandless et al. |
| 10,505,620 | B2 | 12/2019 | Ito et al. |
| 10,522,897 | B1 | 12/2019 | Katko et al. |
| 10,673,646 | B1 | 6/2020 | Shinar et al. |
| 10,734,736 | B1 | 8/2020 | McCandless et al. |
| 11,069,975 | B1 | 7/2021 | Mason et al. |
| 11,088,433 | B2 | 8/2021 | Katko et al. |
| 11,190,266 | B1 | 11/2021 | Black et al. |
| 11,252,731 | B1 | 2/2022 | Levitsky et al. |
| 11,424,815 | B2 | 8/2022 | Black et al. |
| 11,463,969 | B2 | 10/2022 | Li et al. |
| 2001/0005406 | A1 | 6/2001 | Mege et al. |
| 2002/0196185 | A1 | 12/2002 | Bloy |
| 2003/0025638 | A1 | 2/2003 | Apostolos |
| 2003/0062963 | A1 | 4/2003 | Aikawa et al. |
| 2004/0003250 | A1 | 1/2004 | Kindberg et al. |
| 2004/0038714 | A1 | 2/2004 | Rhodes et al. |
| 2004/0229651 | A1 | 11/2004 | Hulkkonen et al. |
| 2005/0237265 | A1 | 10/2005 | Durham et al. |
| 2005/0282536 | A1 | 12/2005 | McClure et al. |
| 2006/0025072 | A1 | 2/2006 | Pan |
| 2007/0024514 | A1 | 2/2007 | Phillips et al. |
| 2007/0147338 | A1 | 6/2007 | Chandra et al. |
| 2007/0184828 | A1 | 8/2007 | Majidi-Ahy |
| 2007/0202931 | A1 | 8/2007 | Lee et al. |
| 2008/0039012 | A1 | 2/2008 | Mckay et al. |
| 2008/0049649 | A1* | 2/2008 | Kozisek ............... H04W 48/20 370/310 |
| 2008/0181328 | A1 | 7/2008 | Harel et al. |
| 2009/0153407 | A1 | 6/2009 | Zhang et al. |
| 2009/0176487 | A1 | 7/2009 | DeMarco |
| 2009/0207091 | A1 | 8/2009 | Anagnostou et al. |
| 2009/0231215 | A1 | 9/2009 | Taura |
| 2009/0296938 | A1 | 12/2009 | Devanand et al. |
| 2010/0197222 | A1 | 8/2010 | Scheucher |
| 2010/0207823 | A1 | 8/2010 | Sakata et al. |
| 2010/0248659 | A1 | 9/2010 | Kawabata |
| 2010/0302112 | A1 | 12/2010 | Lindenmeier et al. |
| 2011/0070824 | A1 | 3/2011 | Braithwaite |
| 2011/0199279 | A1 | 8/2011 | Shen et al. |
| 2011/0292843 | A1 | 12/2011 | Gan et al. |
| 2012/0064841 | A1 | 3/2012 | Husted et al. |
| 2012/0094630 | A1 | 4/2012 | Wisnewski et al. |
| 2012/0194399 | A1 | 8/2012 | Bily et al. |
| 2013/0059620 | A1 | 3/2013 | Cho |
| 2013/0069834 | A1 | 3/2013 | Duerksen |
| 2013/0141190 | A1 | 6/2013 | Kitaoka et al. |
| 2013/0231066 | A1 | 9/2013 | Zander et al. |
| 2013/0303145 | A1 | 11/2013 | Harrang et al. |
| 2013/0324076 | A1 | 12/2013 | Harrang |
| 2014/0094217 | A1 | 4/2014 | Stafford |
| 2014/0171811 | A1 | 6/2014 | Lin et al. |
| 2014/0198684 | A1 | 7/2014 | Gravely et al. |
| 2014/0266946 | A1 | 9/2014 | Bily et al. |
| 2014/0269417 | A1* | 9/2014 | Yu ............... H04W 24/02 370/254 |
| 2014/0293904 | A1 | 10/2014 | Dai et al. |
| 2014/0308962 | A1 | 10/2014 | Zhang et al. |
| 2014/0349696 | A1 | 11/2014 | Hyde et al. |
| 2015/0109178 | A1 | 4/2015 | Hyde et al. |
| 2015/0109181 | A1 | 4/2015 | Hyde et al. |
| 2015/0116153 | A1 | 4/2015 | Chen et al. |
| 2015/0131618 | A1 | 5/2015 | Chen |
| 2015/0162658 | A1 | 6/2015 | Bowers et al. |
| 2015/0222021 | A1 | 8/2015 | Stevenson et al. |
| 2015/0229028 | A1 | 8/2015 | Bily et al. |
| 2015/0236777 | A1 | 8/2015 | Akhtar et al. |
| 2015/0276926 | A1 | 10/2015 | Bowers et al. |
| 2015/0276928 | A1 | 10/2015 | Bowers et al. |
| 2015/0288063 | A1 | 10/2015 | Johnson et al. |
| 2015/0318618 | A1 | 11/2015 | Chen et al. |
| 2015/0372389 | A1 | 12/2015 | Chen et al. |
| 2016/0037508 | A1 | 2/2016 | Sun |
| 2016/0079672 | A1 | 3/2016 | Cerreno |
| 2016/0087334 | A1 | 3/2016 | Sayama et al. |
| 2016/0149308 | A1 | 5/2016 | Chen et al. |
| 2016/0149309 | A1 | 5/2016 | Chen et al. |
| 2016/0149310 | A1 | 5/2016 | Chen et al. |
| 2016/0164175 | A1 | 6/2016 | Chen et al. |
| 2016/0174241 | A1 | 6/2016 | Ansari et al. |
| 2016/0198334 | A1* | 7/2016 | Bakshi ............... H04W 8/005 370/254 |
| 2016/0219539 | A1 | 7/2016 | Kim et al. |
| 2016/0241367 | A1 | 8/2016 | Irmer et al. |
| 2016/0269964 | A1 | 9/2016 | Murray |
| 2016/0345221 | A1 | 11/2016 | Axmon et al. |
| 2016/0365754 | A1 | 12/2016 | Zeine et al. |
| 2016/0373181 | A1 | 12/2016 | Black et al. |
| 2017/0085357 | A1 | 3/2017 | Shahar |
| 2017/0118750 | A1 | 4/2017 | Kikuma et al. |
| 2017/0127295 | A1 | 5/2017 | Black et al. |
| 2017/0127296 | A1 | 5/2017 | Gustafsson et al. |
| 2017/0127332 | A1 | 5/2017 | Axmon et al. |
| 2017/0155192 | A1 | 6/2017 | Black et al. |
| 2017/0155193 | A1 | 6/2017 | Black et al. |
| 2017/0187123 | A1 | 6/2017 | Black et al. |
| 2017/0187426 | A1 | 6/2017 | Su et al. |
| 2017/0194704 | A1 | 7/2017 | Chawgo et al. |
| 2017/0195054 | A1 | 7/2017 | Ashrafi |
| 2017/0238141 | A1 | 8/2017 | Lindoff et al. |
| 2017/0310017 | A1 | 10/2017 | Howard |
| 2017/0339575 | A1 | 11/2017 | Kim et al. |
| 2017/0367053 | A1 | 12/2017 | Noh et al. |
| 2017/0373403 | A1 | 12/2017 | Watson |
| 2018/0013193 | A1 | 1/2018 | Olsen et al. |
| 2018/0019798 | A1 | 1/2018 | Khan et al. |
| 2018/0027555 | A1 | 1/2018 | Kim et al. |
| 2018/0066991 | A1 | 3/2018 | Mueller et al. |
| 2018/0097286 | A1 | 4/2018 | Black et al. |
| 2018/0123692 | A1 | 5/2018 | Leiba |
| 2018/0177461 | A1 | 6/2018 | Bell et al. |
| 2018/0219283 | A1 | 8/2018 | Wilkins et al. |
| 2018/0227035 | A1 | 8/2018 | Cheng et al. |
| 2018/0227445 | A1 | 8/2018 | Minegishi |
| 2018/0233821 | A1 | 8/2018 | Pham et al. |
| 2018/0270729 | A1 | 9/2018 | Ramachandra et al. |
| 2018/0301821 | A1 | 10/2018 | Black et al. |
| 2018/0337445 | A1 | 11/2018 | Sullivan et al. |
| 2018/0368389 | A1 | 12/2018 | Adams |
| 2019/0020107 | A1 | 1/2019 | Polehn et al. |
| 2019/0052428 | A1 | 2/2019 | Chu et al. |
| 2019/0053013 | A1 | 2/2019 | Markhovsky et al. |

(56) References Cited

U.S. PATENT DOCUMENTS

| | | | |
|---|---|---|---|
| 2019/0067813 A1 | 2/2019 | Igura | |
| 2019/0219982 A1 | 7/2019 | Klassen et al. | |
| 2019/0221931 A1 | 7/2019 | Black et al. | |
| 2019/0289482 A1 | 9/2019 | Black | |
| 2019/0336107 A1 | 11/2019 | Hope Simpson et al. | |
| 2020/0008163 A1 | 1/2020 | Black et al. | |
| 2020/0083605 A1 | 3/2020 | Quarfoth et al. | |
| 2020/0137698 A1 | 4/2020 | Black et al. | |
| 2020/0186227 A1 | 6/2020 | Reider et al. | |
| 2020/0205012 A1 | 6/2020 | Bengtsson et al. | |
| 2020/0259552 A1 | 8/2020 | Ashworth | |
| 2020/0313741 A1 | 10/2020 | Zhu et al. | |
| 2020/0366363 A1 | 11/2020 | Li et al. | |
| 2020/0403689 A1 | 12/2020 | Rofougaran et al. | |
| 2021/0036437 A1 | 2/2021 | Zhang et al. | |
| 2021/0067237 A1 | 3/2021 | Sampath et al. | |
| 2021/0234591 A1 | 7/2021 | Eleftheriadis et al. | |
| 2021/0328664 A1 | 10/2021 | Schwab et al. | |
| 2021/0367684 A1 | 11/2021 | Bendinelli et al. | |
| 2021/0368355 A1 | 11/2021 | Liu et al. | |
| 2022/0014933 A1 | 1/2022 | Moon et al. | |
| 2022/0053433 A1 | 2/2022 | Abedini et al. | |

FOREIGN PATENT DOCUMENTS

| | | |
|---|---|---|
| CN | 106572622 A | 4/2017 |
| CN | 106664124 A | 5/2017 |
| CN | 106797074 A | 5/2017 |
| CN | 110034416 A | 7/2019 |
| EP | 3273629 A1 | 1/2018 |
| JP | S61-1102 A | 1/1986 |
| JP | H09-36656 A | 2/1997 |
| JP | H09-214418 A | 8/1997 |
| JP | 2000-111630 A | 4/2000 |
| JP | 3307146 B2 | 7/2002 |
| JP | 2004-270143 A | 9/2004 |
| JP | 3600459 B2 | 12/2004 |
| JP | 2007-81648 A | 3/2007 |
| JP | 2007-306273 A | 11/2007 |
| JP | 2008-153798 A | 7/2008 |
| JP | 2009-514329 A | 4/2009 |
| JP | 2010-226457 A | 10/2010 |
| JP | 2011-507367 A | 3/2011 |
| JP | 2011-508994 A | 3/2011 |
| JP | 2012-175189 A | 9/2012 |
| JP | 2013-539949 A | 10/2013 |
| JP | 2014-075788 A | 4/2014 |
| JP | 2014-207626 A | 10/2014 |
| JP | 2014-531826 A | 11/2014 |
| JP | 2016-139965 A | 8/2016 |
| JP | 2017-220825 A | 12/2017 |
| JP | 2018-14713 A | 1/2018 |
| JP | 2018-173921 A | 11/2018 |
| JP | 2020-523863 A | 8/2020 |
| JP | 2020-145614 A | 9/2020 |
| KR | 10-2006-0031895 A | 4/2006 |
| KR | 10-2008-0093257 A | 10/2008 |
| KR | 10 2016 0113100 A | 9/2016 |
| TW | 202037208 A | 10/2020 |
| WO | 2007001134 A1 | 1/2007 |
| WO | 2010104435 A1 | 9/2010 |
| WO | 2012050614 A1 | 4/2012 |
| WO | 2012096611 A2 | 7/2012 |
| WO | 2012161612 A1 | 11/2012 |
| WO | 2013023171 A1 | 2/2013 |
| WO | 2015196044 A1 | 12/2015 |
| WO | 2016044069 A1 | 3/2016 |
| WO | 2017008851 A1 | 1/2017 |
| WO | 2017014842 A1 | 1/2017 |
| WO | 2017193056 A1 | 11/2017 |
| WO | 2018144940 A1 | 8/2018 |
| WO | 2018179870 A1 | 10/2018 |
| WO | 2020095597 A1 | 5/2020 |
| WO | 2021003112 A1 | 1/2021 |

OTHER PUBLICATIONS

Office Communication for U.S. Appl. No. 15/925,612 dated Jun. 15, 2018, pp. 1-9.
U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2018, pp. 1-12.
Office Communication for U.S. Appl. No. 16/136,119 dated Mar. 15, 2019, pp. 1-8.
Office Communication for U.S. Appl. No. 16/292,022 dated Jun. 7, 2019, pp. 1-13.
Office Communication for U.S. Appl. No. 16/049,630 dated Apr. 12, 2019, pp. 1-13.
Office Communication for U.S. Appl. No. 16/268,469 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated May 15, 2019, pp. 1-17.
International Search Report and Written Opinion for International Patent Application No. PCT/US2019/022942 dated Jul. 4, 2019, pp 1-12.
International Search Report and Written Opinion for International Patent Application No. PCT/US2019/022987 dated Jul. 2, 2019, pp. 1-13.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/440,815 dated Oct. 7, 2019, pp. 1-5.
Office Communication for U.S. Appl. No. 16/268,469 dated Sep. 10, 2019, pp. 1-11.
International Search Report and Written Opinion for International Patent Application No. PCT/US2019/041053 dated Aug. 27, 2019, pp. 1-8.
Office Communication for U.S. Appl. No. 16/568,096 dated Oct. 24, 2019, pp. 1-10.
International Search Report and Written Opinion for International Patent Application No. PCT/US2019/047093 dated Oct. 21, 2019, pp. 1-7.
Office Communication for U.S. Appl. No. 16/049,630 dated Dec. 9, 2019, pp. 1-13.
Office Communication for U.S. Appl. No. 16/440,815 dated Jan. 8, 2020, pp. 1-8.
Office Communication for U.S. Appl. No. 16/730,932 dated Mar. 6, 2020, pp. 1-13.
Office Communication for U.S. Appl. No. 16/049,630 dated Mar. 31, 2020, pp. 1-15.
Office Communication for U.S. Appl. No. 16/734,195 dated Mar. 20, 2020, pp. 1-8.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for International Patent Application No. PCT/US2020/016641 dated Apr. 14, 2020, pp. 1-7.
International Search Report and Written Opinion for International Patent Application No. PCT/US2020/013713 dated Apr. 21, 2020, pp. 1-8.
Office Communication for U.S. Appl. No. 16/049,630 dated Aug. 19, 2020, pp. 1-18.

(56) References Cited

OTHER PUBLICATIONS

Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/983,978 dated Sep. 16, 2020, pp. 1-7.
Office Communication for U.S. Appl. No. 16/049,630 dated Oct. 15, 2020, pp. 1-16.
Office Communication for U.S. Appl. No. 16/983,978 dated Oct. 27, 2020, pp. 1-13.
International Search Report and Written Opinion for International Patent Application No. PCT/US2020/048806 dated Nov. 17, 2020, pp. 1-9.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.
Office Communication for U.S. Appl. No. 16/983,927 dated Jan. 6, 2021, pp. 1-8.
Office Communication for U.S. Appl. No. 16/846,670 dated Feb. 8, 2021, pp. 1-4.
Office Communication for U.S. Appl. No. 16/983,978 dated Feb. 10, 2021, pp. 1-11.
Office Communication for U.S. Appl. No. 16/846,670 dated Apr. 2, 2021, pp. 1-9.
Office Communication for U.S. Appl. No. 16/730,690 dated Apr. 8, 2021, pp. 1-11.
Office Communication for U.S. Appl. No. 17/177,131 dated Apr. 9, 2021, pp. 1-17.
Office Communication for U.S. Appl. No. 17/177,145 dated Apr. 19, 2021, pp. 1-11.
Office Communication for U.S. Appl. No. 17/112,940 dated Jul. 21, 2021, pp. 1-22.
International Search Report and Written Opinion for International Patent Application No. PCT/US2021/026400 dated Jul. 20, 2021, pp. 1-7.
Office Communication for U.S. Appl. No. 17/177,145 dated Aug. 3, 2021, pp. 1-16.
Office Communication for U.S. Appl. No. 17/177,131 dated Aug. 6, 2021, pp. 1-16.
Office Communication for U.S. Appl. No. 17/112,940 dated Aug. 9, 2021, pp. 1-20.
International Search Report and Written Opinion for International Patent Application No. PCT/US2021/034479 dated Aug. 10, 2021, pp. 1-7.
Office Communication for U.S. Appl. No. 17/332,136 dated Sep. 2, 2021, pp. 1-9.
Office Communication for Chinese Patent Application No. 201980019925.1 dated Sep. 27, 2021, pp. 1-25.
Office Communication for U.S. Appl. No. 17/177,145 dated Oct. 14, 2021, pp. 1-5.
International Search Report and Written Opinion for International Patent Application No. PCT/US2021/043308 dated Nov. 2, 2021, pp. 1-8.
Office Communication for U.S. Appl. No. 17/177,131 dated Nov. 12, 2021, pp. 1-5.
Extended European Search Report for European Patent Application No. 19772471.9 dated Nov. 8, 2021, pp. 1-8.
Office Communication for U.S. Appl. No. 17/177,145 dated Nov. 16, 2021, pp. 1-16.
Office Communication for U.S. Appl. No. 17/177,131 dated Dec. 17, 2021, pp. 1-14.
Office Communication for U.S. Appl. No. 17/112,940 dated Dec. 22, 2021, pp. 1-15.
International Search Report and Written Opinion for International Patent Application No. PCT/US2021/049502 dated Dec. 14, 2021, pp. 1-8.
Office Communication for U.S. Appl. No. 17/469,694 dated Jan. 20, 2022, pp. 1-9.
Office Communication for U.S. Appl. No. 17/537,233 dated Feb. 4, 2022, pp. 1-9.
Office Communication for U.S. Appl. No. 17/112,940 dated Mar. 17, 2022, pp. 1-16.
Office Communication for U.S. Appl. No. 17/576,832 dated Mar. 18, 2022, pp. 1-15.
Office Communication for U.S. Appl. No. 17/177,145 dated Mar. 24, 2022, pp. 1-18.
Office Communication for U.S. Appl. No. 17/306,361 dated Mar. 28, 2022, pp. 1-7.
Extended European Search Report for European Patent Application No. 19844867.2 dated Mar. 30, 2022, pp. 1-16.
Office Communication for U.S. Appl. No. 17/576,832 dated Apr. 1, 2022, pp. 1-14.
Office Communication for U.S. Appl. No. 17/585,418 dated Apr. 8, 2022, pp. 1-9.
Yurduseven, Okan et al., "Dual-Polarization Printed Holographic Multibeam Metasurface Antenna" Aug. 7, 2017, IEEE Antennas and Wireless Propagation Letters. PP. 10.1109/LAWP.2017, pp. 1-4.
Gao, S.S. et al., "Holographic Artificial Impedance Surface Antenna Based on Circular Patch", 2018 International Conference on Microwave and Millimeter Wave Technology (ICMMT), 2018, pp. 1-3.
Nishiyama, Eisuke et al., "Polarization Controllable Microstrip Antenna using Beam Lead PIN Diodes", 2006 Asia-Pacific Microwave Conference, 2006, pp. 1-4.
Vu, Trung Kien et al., "Joint Load Balancing and Interference Mitigation in 5G Heterogeneous Networks," IEEE Transactions on Wireless Communications, 2017, vol. 16, No. 9, pp. 6032-6046.
Black, Eric J., "Holographic Beam Forming and MIMO," Pivotal Commware, 2017, pp. 1-8.
Björn, Ekman, "Machine Learning for Beam Based Mobility Optimization in NR," Master of Science Thesis in Communication Systems, Department of Electrical Engineering, Linköping University, 2017, pp. 1-85.
Office Communication for U.S. Appl. No. 17/306,361 dated Sep. 9, 2022, pp. 1-7.
Office Communication for U.S. Appl. No. 17/576,832 dated Sep. 23, 2022, pp. 1-5.
Office Communication for U.S. Appl. No. 17/306,361 dated Sep. 27, 2022, pp. 1-7.
Office Communication for U.S. Appl. No. 17/379,813 dated Oct. 5, 2022, pp. 1-11.
Office Communication for U.S. Appl. No. 17/217,882 dated Oct. 13, 2022, pp. 1-14.
Office Communication for U.S. Appl. No. 17/397,442 dated Oct. 27, 2022, pp. 1-8.
Office Communication for U.S. Appl. No. 17/859,632 dated Oct. 27, 2022, pp. 1-12.
International Search Report and Written Opinion for International Patent Application No. PCT/US2022/036381 dated Oct. 25, 2022, pp. 1-8.
Office Communication for U.S. Appl. No. 17/537,233 dated Apr. 20, 2022, pp. 1-9.
Office Communication for U.S. Appl. No. 17/203,255 dated Apr. 26, 2022, pp. 1-17.
Office Communication for U.S. Appl. No. 17/177,131 dated Apr. 27, 2022, pp. 1-14.
International Search Report and Written Opinion for International Patent Application No. PCT/US2022/012613 dated May 10, 2022, pp. 1-8.
International Search Report and Written Opinion for International Patent Application No. PCT/US2022/013942 dated May 10, 2022, pp. 1-8.
Office Communication for U.S. Appl. No. 17/177,145 dated Jun. 3, 2022, pp. 1-5.
Office Communication for U.S. Appl. No. 17/576,832 dated Jul. 13, 2022, pp. 1-15.
Office Communication for U.S. Appl. No. 17/585,418 dated Jul. 22, 2022, pp. 1-6.
Office Communication for U.S. Appl. No. 17/585,418 dated Aug. 4, 2022, pp. 1-2.
Qualcomm Incorporated, "Common understanding of repeaters," 3GPP TSG RAN WG4 #98_e R4-2102829, 2021, https://www.3gpp.

(56) References Cited

OTHER PUBLICATIONS org/ftp/tsg_ran/WG4_Radio/TSGR4_98_e/Docs/R4-2102829.zip, Accessed: May 25, 2022, pp. 1-2.
MediaTek Inc., "General views on NR repeater," 3GPP TSG RAN WG4 #98_e R4-2101156, 2021, https://www.3gpp.org/ftp/tsg_ran/WG4_Radio/TSGR4_98_e/Docs/R4-2101156.zip, Accessed: May 25, 2022, pp. 1-4.
Office Communication for U.S. Appl. No. 17/379,813 dated Feb. 3, 2023, pp. 1-10.
Office Communication for U.S. Appl. No. 17/112,895 dated Feb. 6, 2023, pp. 1-8.
Office Communication for U.S. Appl. No. 17/379,813 dated Feb. 15, 2023, pp. 1-3.
Office Communication for U.S. Appl. No. 17/859,632 dated Feb. 28, 2023, pp. 1-13.
International Search Report and Written Opinion for International Patent Application No. PCT/US2022/047909 dated Feb. 21, 2023, pp. 1-7.
Office Communication for Japanese Patent Application No. JP 2020-548724 dated Mar. 8, 2023, pp. 1-9.
Shimura, Tatsuhiro et al., "A study of indoor area expansion by quasi-millimeter wave repeater," The Collection of Lecture Articles of the 2018 IEICE General Conference, Mar. 2018, pp. 1-5.
Office Communication for U.S. Appl. No. 17/576,832 dated Apr. 28, 2023, pp. 1-15.
Office Communication for U.S. Appl. No. 17/217,882 dated May 15, 2023, pp. 1-6.
Office Communication for U.S. Appl. No. 17/859,632 dated May 16, 2023, pp. 1-4.
Office Communication for Japanese Patent Application No. JP 2021-505304 dated May 9, 2023, pp. 1-6.
Office Communication for U.S. Appl. No. 17/891,970 dated Jun. 16, 2023, pp. 1-11.
Office Communication for U.S. Appl. No. 17/397,442 dated Jun. 23, 2023, pp. 1-15.
Office Communication for U.S. Appl. No. 17/980,391 dated Jul. 3, 2023, pp. 1-9.
Office Communication for Japanese Patent Application No. JP 2020-548724 dated Jun. 15, 2023, pp. 1-5.
International Search Report and Written Opinion for International Patent Application No. PCT/US2023/018993 dated Jun. 27, 2023, pp. 1-9.
Office Communication for U.S. Appl. No. 17/576,832 dated Jul. 13, 2023, pp. 1-4.
Office Communication for U.S. Appl. No. 18/136,238 dated Jul. 20, 2023, pp. 1-8.
Extended European Search Report for European Patent Application No. 20759272.6 dated Nov. 3, 2022, pp. 1-9.
Office Communication for U.S. Appl. No. 17/334,105 dated Nov. 30, 2022, pp. 1-7.
Office Communication for U.S. Appl. No. 17/576,832 dated Dec. 15, 2022, pp. 1-15.
Falconer, David D. et al., "Coverage Enhancement Methods for LMDS," IEEE Communications Magazine, Jul. 2003, vol. 41, Iss. 7, pp. 86-92.

* cited by examiner

| | Operation Step | External Trigger | Description | LED Status |
|---|---|---|---|---|
| Installation mode | Booting up | Power plug into the wall | Processing: plug in power and boot up sequence | Soft Blink: White |
| | ES-x BLE pairing to app | | ES-x trying to pair with app | Soft Blink: Blue |
| | ES-x BLE paired to app | | Process complete: ES-x and app pairing over BLE | Solid: Blue |
| | Quick scan: mmwave | | Short process: scanning to detect mmwave signal | Fast Blink: White |
| | Quick scan: Near Cell | | Need user attention to complete setup mmwave scan complete | Hard Blink: Green |
| | Quick scan: Mid-Cell | | Need user attention to complete setup mmwave scan complete | Hard Blink: Yellow |
| | Quick scan: Cell Edge | | Need user attention to complete setup mmwave scan complete | Hard Blink: Red |
| | Paired: Near Cell | | Scan Complete | Solid: Green (Show for 20 seconds, then dim to 50%) |
| | Paired: Mid-cell | | Scan Complete | Solid: Yellow (Show for 20 seconds, then dim to 50%) |
| | Paired: Cell Edge | | Scan Complete Error | Hard Blink: Red indefinitely |
| | Regular Usage | | Dim: LED color in regular usage | Dim to 50% solid white |
| Regular use Mode | | Single button press, 3<x<5 secs * a second single press >1 sec, gets out of BLE pairing mode | Indicate status change that requires user attention to go into app to automatically pair with the device: Ready to pair | |
| | Ready to Pair BLE | | | Hard Blink: Blue |
| | ES-x BLE paired to app | | Process complete: ES-x and app pairing over BLE | Fast Blink: Blue |
| | Error | | Need user attention: Problem pairing/Lost signal/HW issues/FW issues/Critical errors | Hard Blink: Red |
| FOTA Mode | FOTA Update / Reset | | Performing a short process: SW update | Fast Blink: White |

FIG. 6A

| | | Button | # of presses, Time length (secs.) | Behavior/trigger |
|---|---|---|---|---|
| Install and activation | Power on | | | Unit powers on when plugged in |
| | Initial raster scan | | | App API trigger |
| | Activation of BLE | | | uncommisioned state, automatically turn on for x minutes. |
| Regular usage | Activation of BLE | UAB | Single press, 2<x<5 | Turns on BLE for x secs |
| | Sign of life | UAB | Single tap, <5 secs LED* turns on for 20 secs. And then turns off | LED turns off after successful activation of service. This behavior turns the LED ON to validate unit operation and turns off after 20 secs. |
| | Reset | UAB | >10 secs | Factory reset the device to its initial out of the box state. |

After 20 seconds, LED turns to 50% or less

*FIG. 6B*

INSTALLATION AND ACTIVATION OF RF COMMUNICATION DEVICES FOR WIRELESS NETWORKS

CROSS-REFERENCE TO RELATED APPLICATION

This Utility patent application is a Continuation of U.S. patent application Ser. No. 17/469,694 filed on Sep. 8, 2021, now U.S. Pat. No. 11,297,606 issued on Apr. 5, 2022, which is based on previously filed U.S. Provisional Patent Application No. 63/075,752 filed on Sep. 8, 2020, the benefit of which is claimed under 35 U.S.C. § 119(e) and § 120, and the contents of which are each further incorporated in entirety by reference.

TECHNICAL FIELD

The invention relates generally to employing directional antennas placed on structures, such as poles, or buildings, that provide a wireless network for communicating RF signals between user devices and remotely located resources. Further, in some embodiments, the directional antennas may be installed at the premises of a customer and coupled to base stations and RF signal repeater devices to manage operation of the wireless network.

BACKGROUND

Mobile devices have become the primary mode of wireless communication for most people throughout the world. In the first few generations of wireless communication networks, mobile devices were generally used for voice communication, text messages, and somewhat limited internet access. Newer generations of wireless communication networks have increased bandwidth and lowered latency enough to provide substantially more services to mobile device users, such as purchasing products, paying invoices, streaming movies, playing video games, online learning, dating, and more. Also, for each new generation of wireless communication network, the frequency and strength of the wireless signals are generally increased to provide even more bandwidth with less latency.

Unfortunately, the higher a frequency of a wireless signal, the greater the attenuation of wireless signals passing through physical barriers and over shorter distances than lower frequency wireless signals. Moreover, since the recent rollout of $5^{th}$ generation (5G) wireless communication networks that can use wireless signals with millimeter waveforms at gigahertz frequencies, it has become even more difficult to provide install and activate wireless RF communication devices that provide access to these 5G wireless networks for mobile devices due to these physical barriers.

BRIEF DESCRIPTION OF THE DRAWINGS

FIG. 6A illustrates a table that includes different colors and patterns that provide visual cues as to the status of the RF communication device; and FIG. 6B illustrates a table for operation of manual controls for the RF communication device during installation/activation and regular usage in accordance with the various embodiments of the invention.

DESCRIPTION OF VARIOUS EMBODIMENTS OF THE INVENTION

Figure 1A:
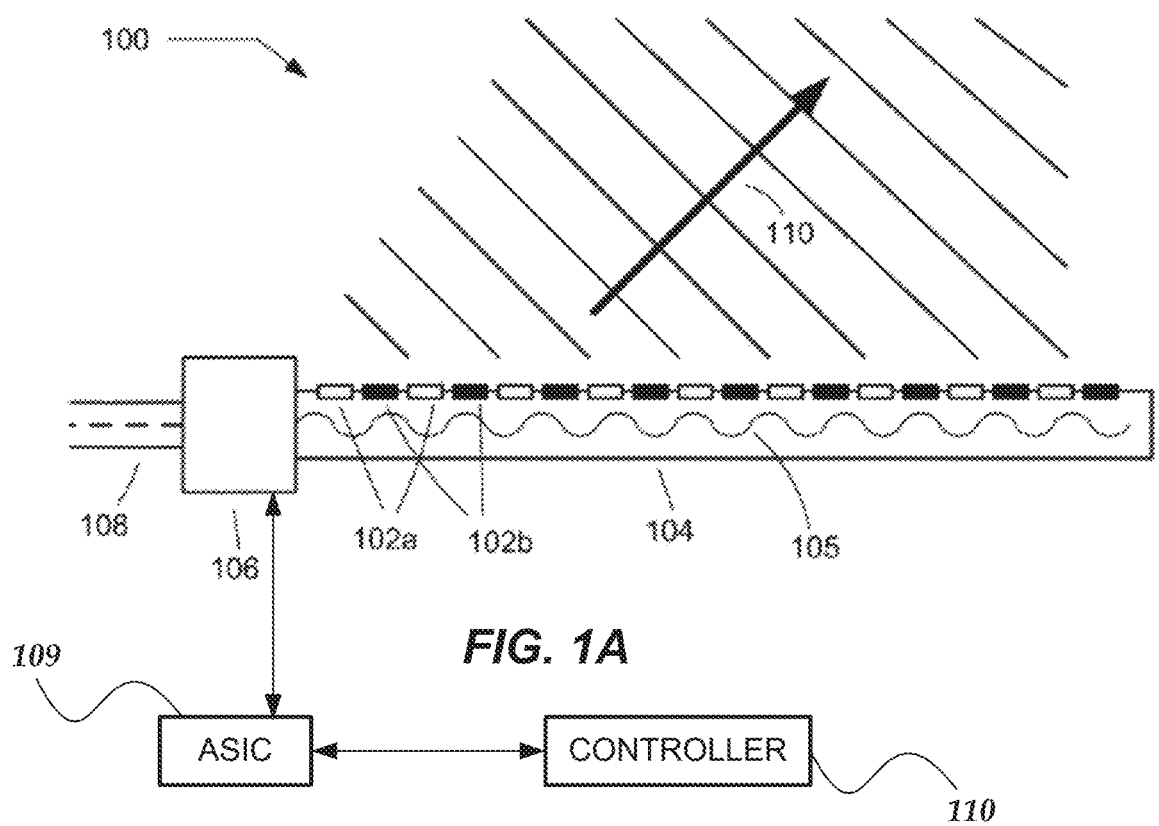
FIG. 1A shown an embodiment of an exemplary surface scattering antenna with multiple varactor elements arranged to propagate electromagnetic waves in such a way as to form an exemplary instance of holographic metasurface antennas (HMA)

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may.

As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

In addition, throughout the specification, the meaning of "a," "an," and "the" include plural references. The meaning of "in" includes "in" and "on."

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. One or more engines can be stored in non-transitory computer-readable storage media and/or computer storage devices and be stored on and executed by one or more general purpose computers, thus creating a special purpose computer configured to provide the engine.

As used herein the term, "user equipment" refers to any stationary, non-stationary, or mobile wireless communication device that a user can employ to wirelessly communicate with one or more other users of other wireless communication devices or remotely located computing resources. A wireless device may enable a user to wirelessly access one or more remotely located computing resources over a network, e.g., websites, Application Programming Interfaces (APIs), databases, datastores, servers, clients, host computers, cloud computing resources, applications, or the like. In one or more embodiments, a wireless device may operate as one or more of a user terminal, mobile telephone, smart mobile telephone, pager, notebook computer, desktop computer, server computer, customer premises equipment, network appliance, base station, access point, switch, router, or the like.

As used herein, "base station" refers to a network computing device that facilitates wireless communication between a wireless network and a plurality of different types of UEs employed by users. The wireless network can employ any type of wireless communication protocols or wireless technologies.

As used herein, "RF repeater device" refers to a type of RF telecommunication device that is used to configure wireless communication over one or more wireless network between a wireless carrier and one or more wireless user equipment (UE) devices that are in communication with an RF communication device located at a structure. The RF repeater device may be statically or dynamically arranged as an RF relay (1 to 1) device, an RF reflector (1 to N) device, or an RF base station proxy device (mimics operation of a remote base station).

As used herein, "structure" refers to any type of building, including dwelling, office building, multi-family residential building, shopping center, sports stadium, school, factory, library, museum, theater, research center, factory, or the like.

As used herein, "Internet of Things", "IoT" or "IOT" refers to an architecture for one or more types of networked elements, such as components, applications, systems, or devices. In one or more embodiments, IoT elements are networked together to provide wireless and/or wired communication and other services between an element management system (EMS) and a plurality of remotely located base stations and remotely located RF signal repeater devices that may be arranged as an RF relay device, RF reflector device, RF base station proxy device in one or more $5^{th}$ generation (5G) or greater generation wireless networks. Further, the IoT elements may also be employed to monitor, store, collect, pre-process, and analyze various types of data and information from the remotely located and differently arranged RF signal repeater devices. Also, the IoT network enables the EMS to employ a beam management system (BMS) to monitor and control the operation of the plurality of RF signal repeater devices.

As used herein, an "element management system" (EMS) refers to a platform or application that manages communication provided by one or more types of telecommunication elements in a network. Typically, the EMS manages the functions and capabilities of each element but does not manage the network traffic between different elements in a network. To support management of the network traffic between the EMS and other elements, the EMS communicates upward to a higher-level network management system (NMS). In one or more embodiments, the network for the EMS and the other elements is arranged as an Internet of Things (IoT) network to provide at least a portion of the NMS functionality and interoperability between each element in the IoT network.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments of the invention are directed to a method, apparatus, or system that provides an application executing on a UE to automate at least a portion of the installation and activation of an electronic RF communication device at a structure, such as a dwelling, or any other location associated with a user. The RF communication device enables management and communication of radio frequency (RF) wireless signals with 5G or higher wireless communication protocols over a wireless network between one or more remote wireless signal sources, e.g., base stations, and one or more UE devices and/or other wireless computing devices at the user's location.

In one or more embodiments, an application is provided for use by different types of users, e.g., a technician and/or a customer/user, to install and activate an RF communication device at a user's location. The application provides for automating at least a portion of the actions for installing the RF communication device and/or UE devices at the location; and subsequently activate the installed RF communication device to provide wireless RF communication between a wireless carrier associated with one or more remotely located base stations and one or more UEs at the user's location. Also, in one or more embodiments, the application may provide for access to one or more video presentations, written tutorials, manuals, instructions, and the like, to inform the user, e.g., answer questions and provide instructions, for one or more of the installation process or the activation process for the RF communication device and/or UE devices at the location.

Additionally, in one or more embodiments, the application may be arranged to alert the user to contact customer service for the wireless carrier and/or a provider of the RF communication device for additional assistance with the installation and/or activation of the RF communication device and/or UE devices at the user's location. The application may be arranged to enable the user to send a message and/or place a telephone call to receive additional assistance and/or information from the wireless carrier and/or the provider of the RF communication device.

Also, in one or more embodiments, the RF communication device and/or the application may provide visual and/or audio cues regarding a status of the installation or activation of the RF communication device provided by light emitting diodes (LED), e.g., color, intensity, and/or frequency of emitted light. Further, audio cues may include one or more of tone, intensity or frequency of sound emitted by audio speakers.

Further, in one or more embodiments, 5G wireless signals may be represented by non-millimeter waveforms at less than gigahertz frequencies (Frequency Range 1—FR1) and/or millimeter waveforms at gigahertz frequencies (Frequency Range 2—FR2) via $5^{th}$ Generation (5G) or higher wireless communication protocols. 5G communication protocols, such as 5G New Radio (5G NR) may be employ various nodes over a wireless network to communicate with remote wireless base stations, RF repeater devices, UEs, customer premises equipment devices, and other wireless computing devices. In one or more embodiments, the RF wireless signals having millimeter waveforms may be arranged as a beam waveform that is radiated in a direction, an azimuth and an elevation to reach a physical location of a node in the wireless network.

Also, in one or more embodiments, one or more portions of the RF wireless signals may be communicated at non-gigahertz frequencies with non-millimeter waveforms via 5G or higher communication protocols and/or $4^{th}$ Generation (4G) or lower communication protocols, such as Long Term Evolution (LTE), and the like. Further, RF wireless signals that provide control for the application and/or the RF communication device may be communicated out of band via non-gigahertz frequencies with 5G, 4G, or other communication protocols to reduce attenuation of these control signals passing through physical barriers, provide lower energy consumption, and/or save costs.

Additionally, in one or more embodiments, the RF communication device may provide wireless communication from a location external or internal to a structure at the user's location. For an internal location, the RF communication device may be arranged to communicate through a physical barrier, such as a wall or a window of the structure, with one or more remotely located base stations external to the structure. In one or more embodiments, the RF communication device may be arranged to communicate RF wireless signals at 5G or higher wireless communication protocols with one or more remote wireless base station nodes and with one or more UEs located inside the structure behind the physical barrier.

In one or more embodiments, the RF communication device includes one or more external (externally facing) antennas that communicate upload and download RF wireless signals with one or more remotely located wireless base stations and one or more internal antennas (internally facing) that communicate the upload and download RF wireless signals with one or more UEs at the structure.

Also, in one or more embodiments, an RF communication device may employ one or more external antennas to communicate RF signals via 5G or higher communication protocols with one or more remote base station devices. Also, the RF communication device may then be arranged to repeat these RF signals with one or more internal antennas via 5G or higher communication protocols and/or one or more other antennas via 4G protocols to various other nodes within the structure, such as UEs or other wireless computing devices.

In one or more embodiments, a UE may be any terminal device and/or associated communication equipment located at a user's location and/or premises which can provide communication over one or more wireless and/or wired telecommunication channels provided by one or more telecommunications carriers. The UE is typically established at a location in a structure separate from other communication equipment provided by a carrier or some other communication service provider. The UE may include one or more IP telephones, mobile phones, routers, network switches, residential gateways, set top television boxes, home network adapters, or the like.

Also, in one or more embodiments, the wireless network may employ a Beam Management System (BMS) to manage commissioning, upgrading, maintaining, analyzing, and load balancing for a plurality of base stations and RF repeater devices that are arranged to communicate RF signals over a system as disclosed herein. In one or more embodiments, the BMS may be a cloud based platform that enables users, such as administrative users and technicians, to remotely access information and/or control one or more of the base stations, RF repeater devices, or RF communication devices in one or more wireless networks.

In one or more embodiments, the RF communication device provides external and internal antennas to transmit and receive wireless signals through a physical barrier, such as walls or windows, to wireless and wired computing devices that are located internal to a structure that is formed in part by the physical barrier at the user's location and/or premises. In one or more embodiments, the wireless signals are millimeter waveforms with gigahertz frequencies that are communicated with 5G communication protocols by one or more remote base station nodes located external to the physical barrier.

In one or more embodiments, one or more external antennas are coupled to an exterior surface of a window barrier or an exterior wall of a structure at the user's location and/or premises, and one or more glass field couplers or near field couplers are positioned on both the interior and exterior sides of the exterior wall and/or window barrier. Also, the one or more external antennas may be configured to receive and transmit wireless signals with the one or more remote base station nodes. In one or more embodiments, the wireless signals are communicated by the one or more patch antennas or glass field couplers bi-directionally through the exterior wall and/or window barrier.

In one or more embodiments, one or more amplifiers are coupled to the one or more couplers to boost the strength of the received and transmitted wireless signals communicated through the exterior wall and/or window barrier. Further, the one or more amplifiers may provide bi-directional amplification that is separately timed and isolated for the received and transmitted wireless signals. Also, in one or more embodiments, the one or more amplifiers may be located on the exterior side of the exterior wall and/or window barrier, on the interior side of the exterior wall and/or window barrier, two or more amplifiers may be located on both the external and internal sides of the exterior wall and/or window barrier, or no amplifier may be provided when the CPE is integrated with the external and internal antennas.

In one or more embodiments, the CPE receives and transmits the wireless signals communicated by the couplers directly (when integrated together with the invention) or receives and transmits an amplified version of the wireless signals provided by the one or more amplifiers when not integrated together with the invention. The CPE can communicate these wireless signals and/or transform them into other signals that employ one or more other wireless communication protocols, which are communicated to one or more wireless devices disposed inside the structure. Additionally, in one or more embodiments, the CPE may transform the communicated wireless signals into wired signals that are communicated to one or more wired devices disposed inside the structure. These wired signals may be communicated in any wired communication protocol to the one or more wired devices, including ethernet, coaxial cable, infrared, optical fiber, or the like.

Additionally, in one or more embodiments, one or more internal antennas are provided to communicate the wireless signals inside the structure to one or more consumer provided equipment devices that are not integrated into the invention. Further, in one or more embodiments, one or more CPE devices may be provided to boost, provide, and/or repeat the wireless signals provided by the one or more internal antennas using any wireless communication protocols. Also, in one or more embodiments, the one or more CPE devices may be integrated with the one or more couplers. The integration of the CPE devices with the one or more couplers may be employed to reduce size, component complexity, and/or cost by eliminating a need for similar functionality provided by the one or more amplifiers and/or the one or more external antennas or internal antennas.

In one or more embodiments, all or most of the components for bi-directionally communicating wireless signals (optionally the CPE devices too) may be disposed on the external surface of the window, the internal surface of the window, or on both the internal and external surfaces of the window. Each of these different configurations of the invention are discussed below and shown in regard to FIGS. 2B, 2C and 2D.

Additionally, an advantage of one or more embodiments of this invention is that the wireless signal is not processed and instead is kept intact in the analog domain from the remote wireless signal base station to the CPE device. By not having to perform processing, cost, component complexity, and energy use can be reduced. It is a noteworthy advantage that the one or more embodiments of the invention do not require analog to digital converters, digital signal processors, digital components, frequency processors, or the like to communicate the wireless signals with the CPE device.

Additionally, although not shown, one or more of the embodiments of the invention could be applied to other types of barriers, such as exterior walls made of one or more types of materials, such as wood, concrete, composite materials, and metal. For these other embodiments used with other types of barriers, the glass field couplers may be replaced with another type of coupler, such as a near field coupler or patch antennas, that communicate the wireless signals through one or more barriers with substantially the same functionality.

In one or more embodiments, one or more inductive charge (magnetic loop) couplers are positioned on both sides of the interior and exterior surfaces of the window barrier. The one or more inductive charge couplers may be connected to an electrical power source, such as one or more of a fixed electrical connection, a removable electrical connection, a battery, a solar cell panel, or the like. Further, electrical power may be provided by the one or more inductive couplers to one or more of the one or more external antennas, the one or more glass field couplers, the one or more amplifiers, the one or more internal antennas, or CPE. Additionally, in one or more embodiments, the structure be an office building, shopping center, sports stadium, residence, school, factory, library, theater, or the like.

Also, in one or more embodiments, the external antennas are holographic beam forming antennas, such as one or more holographic metasurface antennas (HMAs) or the like. An HMA may use an arrangement of controllable elements to produce an object wave. Also, in one or more embodiments, the controllable elements may employ individual electronic circuits that have two or more different states. In this way, an object wave can be modified by changing the states of the electronic circuits for one or more of the controllable elements. A control function, such as a hologram function, can be employed to define a current state of the individual controllable elements for a particular object wave. In one or more embodiments, the hologram function can be predetermined or dynamically created in real time in response to various inputs and/or conditions. In one or more embodiments, a library of predetermined hologram functions may be provided. In the one or more embodiments, any type of HMA can be used to that is capable of producing the beams described herein.

Illustrated Operating Environment

FIG. 1A illustrates one embodiment of a holographic metasurface antenna (HMA) which takes the form of a surface scattering antenna 100 that includes multiple scattering elements 102a, 102b that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102a, 102b may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102a, 102b are adjustable scattering elements having electromagnetic properties that are adjustable in response to one or more external inputs. Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1A, scattering elements that have been adjusted to a first state having first electromagnetic properties are depicted as the first elements 102a, while scattering elements that have been adjusted to a second state having second electromagnetic properties are depicted as the second elements 102b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1A, the scattering elements 102a, 102b have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102a, 102b are responsive to the reference wave 105 to produce a plurality of scattered electromagnetic waves having amplitudes that are functions of (e.g. are proportional to) the respective first and second couplings. A superposition of the scattered electromagnetic waves comprises an electromagnetic wave that is depicted, in this example, as an object wave 110 that radiates from the surface scattering antenna 100.

FIG. 1A illustrates a one-dimensional array of scattering elements 102a, 102b. It will be understood that two- or three-dimensional arrays can also be used. In addition, these arrays can have different shapes. Moreover, the array illustrated in FIG. 1A is a regular array of scattering elements 102a, 102b with equidistant spacing between adjacent scattering elements, but it will be understood that other arrays may be irregular or may have different or variable spacing between adjacent scattering elements. Also, Application Specific Integrated Circuit (ASIC) 109 is employed to control the operation of the row of scattering elements 102a and 102b. Further, controller 110 may be employed to control the operation of one or more ASICs that control one or more rows in the array.

Figure 1B:
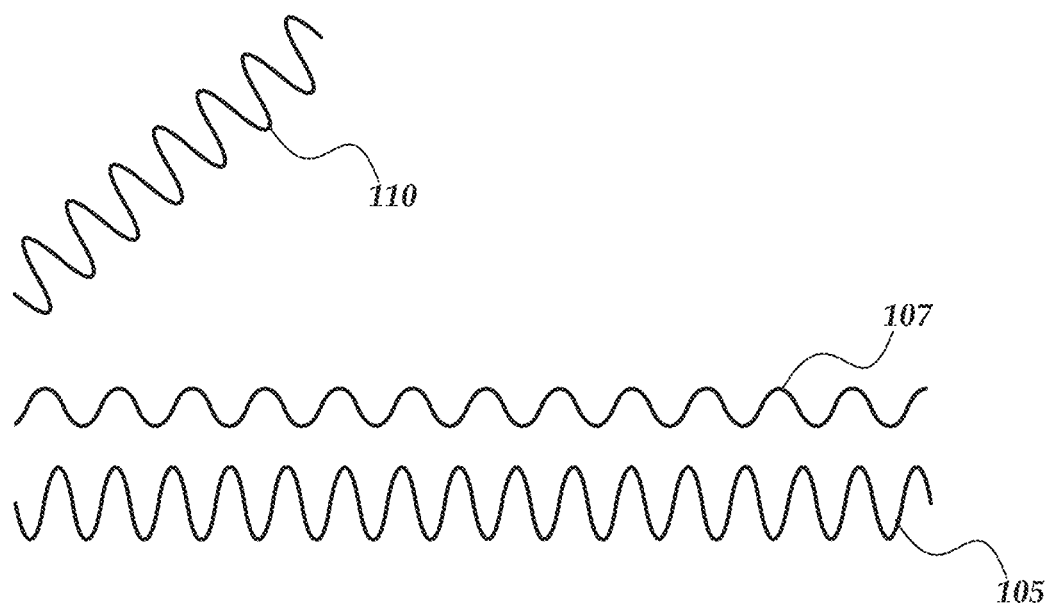
FIG. 1B shows a representation of one embodiment of a synthetic array illustrating a reference waveform and a hologram waveform (modulation function) that in combination provide an object waveform of electromagnetic waves.
Figure 1C:
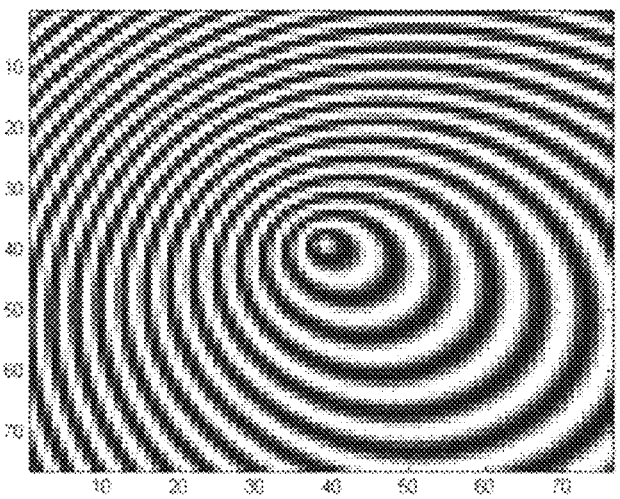
FIG. 1C shows an embodiment of an exemplary modulation function for an exemplary surface scattering antenna.
Figure 1D:
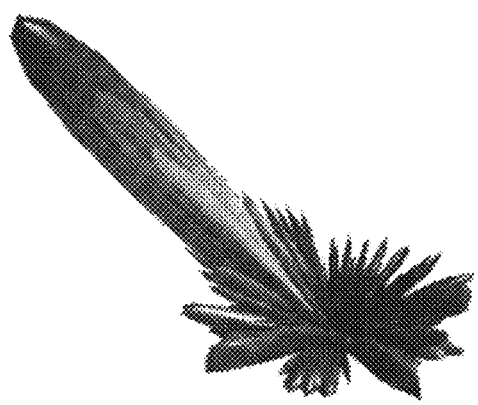
FIG. 1D shows an embodiment of an exemplary beam of electromagnetic waves generated by the modulation function of FIG. 1C.

The array of scattering elements 102a, 102b can be used to produce a far-field beam pattern that at least approximates a desired beam pattern by applying a modulation pattern 107 (e.g., a hologram function, H) to the scattering elements receiving the reference wave ($\psi_{ref}$) 105 from a reference wave source, as illustrated in FIG. 1B. Although the modulation pattern or hologram function 107 in FIG. 1B is illustrated as sinusoidal, it will be recognized non-sinusoidal functions (including non-repeating or irregular functions) may also be used. FIG. 1C illustrates one example of a modulation pattern and FIG. 1D illustrates one example of a beam generated using that modulation pattern.

In at least some embodiments, a computing system can calculate, select (for example, from a look-up table or database of modulation patterns) or otherwise determine the modulation pattern to apply to the scattering elements 102a, 102b receiving the RF energy that will result in an approximation of desired beam pattern. In at least some embodiments, a field description of a desired far-field beam pattern is provided and, using a transfer function of free space or any other suitable function, an object wave ($\psi_{obj}$) 110 at an antenna's aperture plane can be determined that results in the desired far-field beam pattern being radiated. The modulation function (e.g., hologram function) can be determined which will scatter the reference wave 105 into the object wave 110. The modulation function (e.g., hologram function) is applied to scattering elements 102a, 102b, which are excited by the reference wave 105, to form an approximation of an object wave 110 which in turn radiates from the aperture plane to at least approximately produce the desired far-field beam pattern.

In at least some embodiments, the hologram function H (i.e., the modulation function) is equal the complex conjugate of the reference wave and the object wave, i.e., $\psi_{ref}^{*}\psi_{obj}$. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively, or additionally, embodiments of the surface scattering antenna may be adjusted to provide a selected near field radiation profile, e.g. to provide near-field focusing or near-field nulls.

The surface scattering antenna can be considered a holographic beamformer which, at least in some embodiments, is dynamically adjustable to produce a far-field radiation pattern or beam. In some embodiments, the surface scattering antenna includes a substantially one-dimensional wave-propagating structure 104 having a substantially one-dimensional arrangement of scattering elements. In other embodiments, the surface scattering antenna includes a substantially two-dimensional wave-propagating structure 104 having a substantially two-dimensional arrangement of scattering elements. In at least some embodiments, the array of scattering elements 102a, 102b can be used to generate a narrow, directional far-field beam pattern, as illustrated, for example, in FIG. 1C. It will be understood that beams with other shapes can also be generated using the array of scattering elements 102a, 102b.

In at least some of the embodiments, the narrow far-field beam pattern can be generated using a holographic metasurface antenna (HMA) and may have a width that is 5 to 20 degrees in extent. The width of the beam pattern can be determined as the broadest extent of the beam or can be defined at a particular region of the beam, such as the width at 3 dB attenuation. Any other suitable method or definition for determining width can be used.

A wider beam pattern (also referred to as a "radiation pattern") is desirable in a number of applications, but the achievable width may be limited by, or otherwise not available using, a single HMA. Multiple instances of HMAs can be positioned in an array of HMAs to produce a wider composite far-field beam pattern. It will be recognized, however, that the individual beam patterns from the individual HMAs will often interact and change the composite far-field beam pattern so that, at least in some instances, without employing the one or more embodiments of the invention, the simple combination of the outputs of multiple instances of HMAs produces a composite far-field beam pattern that does not achieve the desired or intended configuration.

Figure 1E:
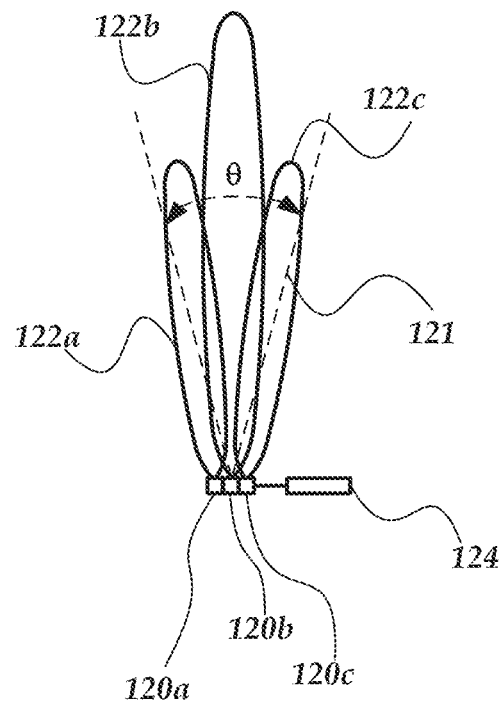
FIG. 1E shows a side view of another embodiment of an exemplary arrangement of multiple instances of HMAs.
Figure 1F:
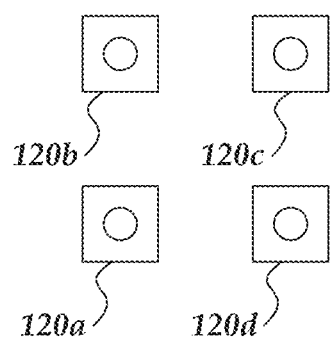
FIG. 1F shows a top view of yet another embodiment of an exemplary arrangement of multiple instances of HMAs.

FIG. 1E illustrates an arrangement of HMAs 120a, 120b, 120c that produce beams 122a, 122b, 122c where the middle beam 122b is substantially different in size and shape from the other two beams 122a, 122c. FIG. 1F illustrates, in a top view, yet another arrangement of HMAs 120a, 120b, 120c, 120d which form a two-dimensional array.

Also, one or more particular shapes of beam patterns, such as wide beam patterns, narrow beam patterns or composite beam patterns, may be desirable in a number of applications at different times for different conditions, but may not be practical or even available using a single HMA. In one or more embodiments, multiple instances of HMAs may be positioned in an array to produce a wide variety of composite, near-field, and/or far-field beam patterns without significant cancellation or signal loss. Since the object waves of multiple instances of HMAs may interfere with each other, adjustment to their object waves may be desirable to generate a beam pattern "closer" to the desired shape of a particular beam pattern. Any suitable methodology or metric can be used to determine the "closeness" of a beam pattern to a desired beam pattern including, but not limited to, an average deviation (or total deviation or sum of the magnitudes of deviation) over the entire beam pattern or a defined portion of the beam pattern from the desired beam pattern or the like.

In one of more embodiments, a physical arrangement of HMAs may be existing or can be constructed and coupled to a reference wave source. In one or more embodiments, a hologram function can be calculated, selected, or otherwise provided or determined for each of the HMAs. Each of the HMAs includes an array of dynamically adjustable scattering elements that have an adjustable electromagnetic response to a reference wave from the reference wave source. The hologram function for the HMA defines adjustments of the electromagnetic responses for the scattering elements of the HMA to produce an object wave that is emitted from the HMA in response to the reference wave. The object waves produced by the HMAs may be combined to produce a composite beam. Any suitable method or technique can be used to determine or provide any arrangement of HMAs to produce a composite beam, such as the exemplary composite beams illustrated in FIGS. 1E and 1F.

Figure 2A:
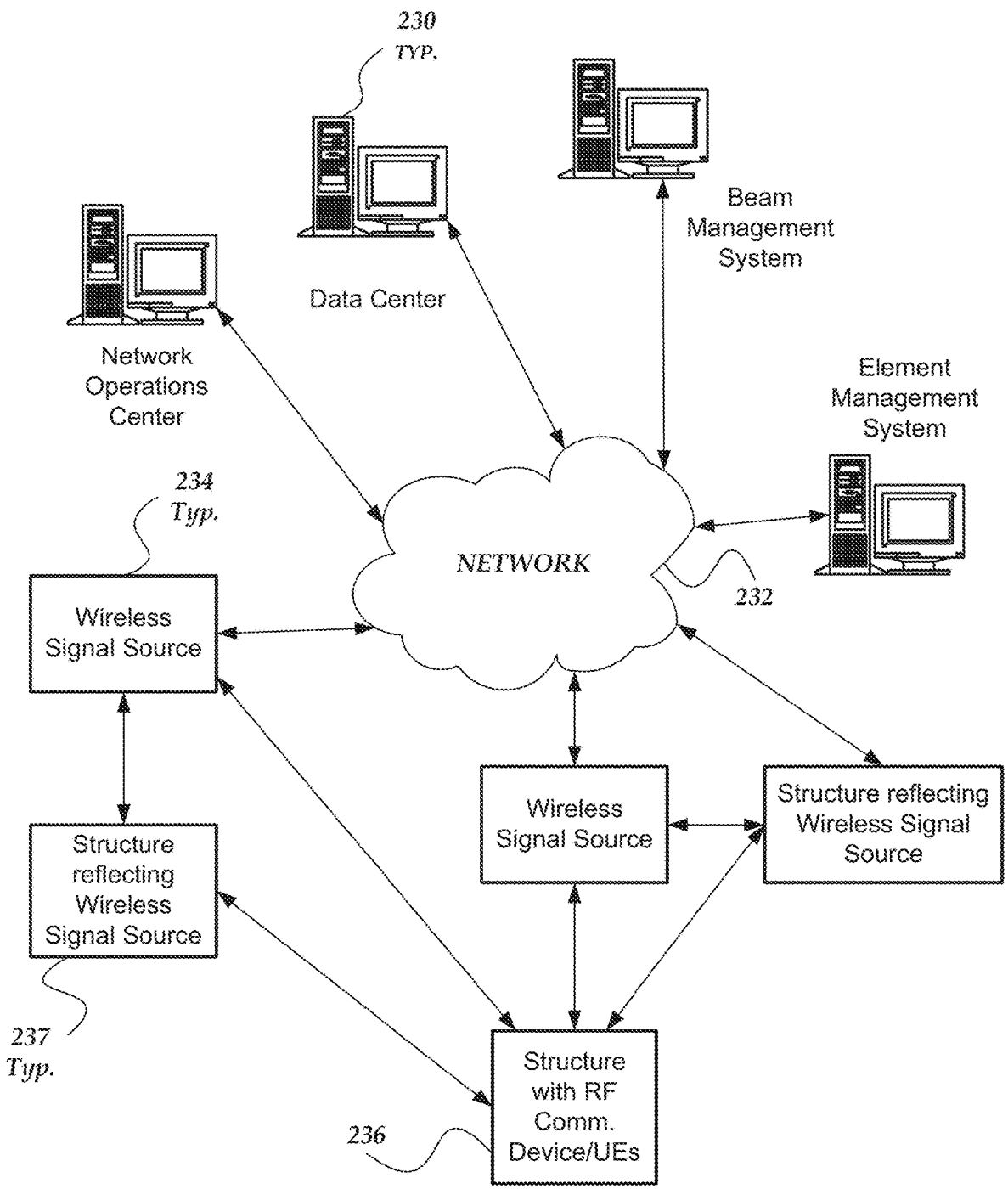
FIG. 2A shows a top view of an embodiment of an exemplary environment, including an arrangement of a network operations center, wireless signal base station, network and multiple structures, in which various embodiments of the invention may be implemented.

FIG. 2A illustrates an overview of system for communicating data from one or more data centers 230 which facilitate one or more network operations centers, beam management systems, and element management systems to route the data to one or more wireless signal sources, such as RF repeater devices, or base stations that are arranged to communicate data in the form of wireless signals to RF communication devices 248 which relay the wireless signals to UEs (not shown) located inside of structure 236. As shown, the data is communicated from one or more data centers 238 and routed in part by one or more network operations centers, beam management systems, and/or element management systems over network 232 to multiple wireless signal sources 234 and reflective structures 237 of wireless signal sources that are in communication with one or more RF communication devices (not shown) located inside or outside of one or more structures 236.

Network 232 may be configured to couple network operation center computers, beam management system computers, and element management system computers with other computing devices, which may include one or more base stations, RF repeater devices or wireless signal sources 234. Network 232 may include various wired and/or wireless technologies for communicating with a remote device, such as, but not limited to, USB cable, Bluetooth®, or the like. In some embodiments, network 232 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 232 may be enabled to employ various forms of communication technology, topology, computer-readable media, or the like, for communicating information from one electronic device to another. For example, network 232 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 232 may include various communication technologies by which information may travel between computing devices.

Network 232 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer. Such sub-networks may include mesh networks, Wireless LAN (WLAN) networks, cellular networks, or the like. In one or more of the various embodiments, the system may include more than one wireless network.

Network 232 may employ a plurality of wired and/or wireless communication protocols and/or technologies. Examples of various generations (e.g., third (3G), fourth (4G), fifth (5G) or higher) communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), 5G New Radio (5G NR), 5G Technical Forum (5GTF) Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

In various embodiments, at least a portion of network 232 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Figure 2B:
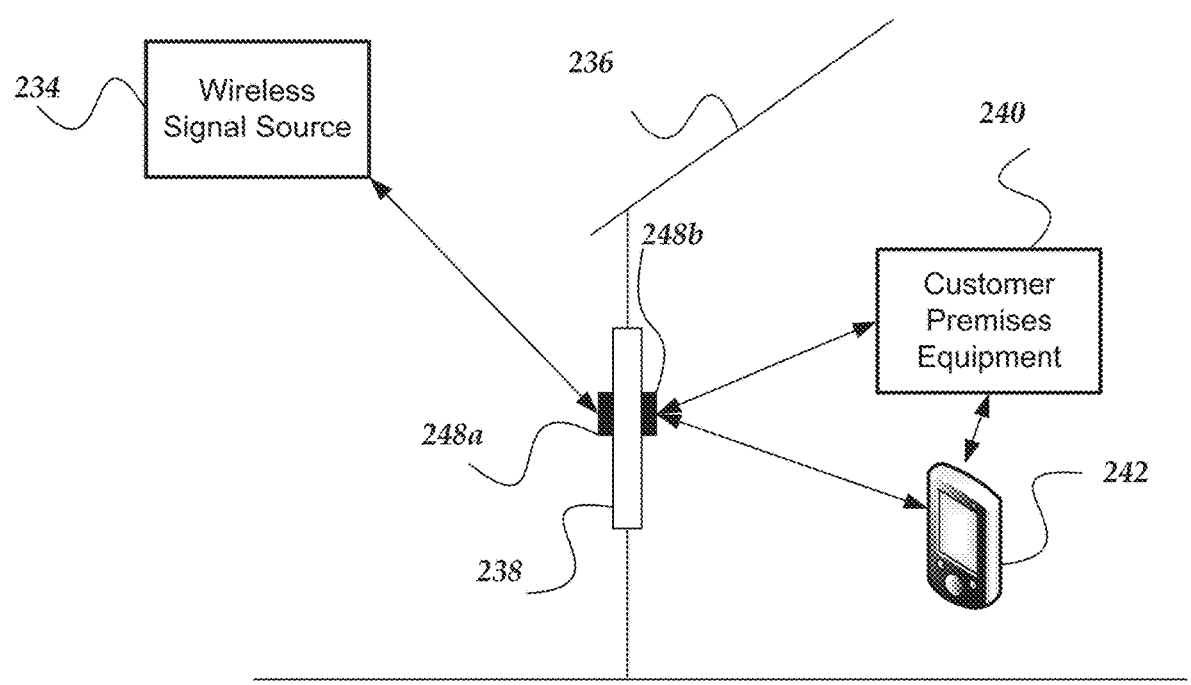
FIG. 2B illustrates a schematic view of a wireless signal base station communicating with an RF communication device having one or more HMAs disposed on an outside surface of a window of a structure and the wireless signals are communicated, by electronic components disposed on an inside surface of the window of the structure, to a customer provided equipment (CPE) device disposed inside the structure and which communicates the wireless signals to one or more wireless computing devices.

FIG. 2B illustrates an overview of wireless signal source 234 that is arranged to provide wireless communication between a remotely located base station (not shown) and an RF communication device having separate components (248a and 248b) that are respectively disposed inside and outside of structure 236. Component 248a includes one or more HMAs attached to the exterior surface of window 238 for structure 236. On the opposing interior surface of window 238, another component 248b provides one or more interior antennas to communicate the wireless signals to one or more UEs inside structure 236. The one or more UEs may include customer premises equipment device 240, mobile UE device 242 and/or other wired or wireless devices (not shown) located inside the structure 236. Although not shown, glass field couplers on opposite sides of window 238 may be employed to wirelessly transmit and receive the wireless signals through the window. Also not shown, one or more bidirectional amplifiers may be provided to boost a gain of the wireless signals communicated through window 238. Also, inductive chargers batteries, electrical outlets, or the like (not shown) may be used to provide electrical power to the separate components 248a and 248b of the RF communication device.

Figure 2C:
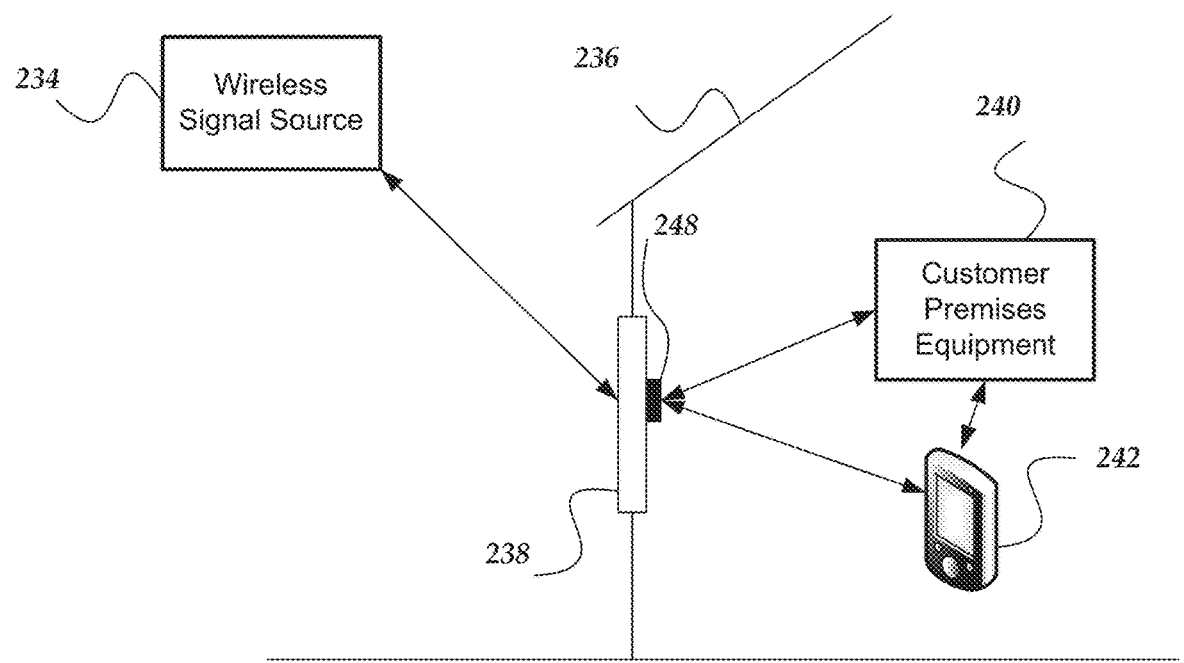
FIG. 2C shows a schematic view of a wireless signal base station communicating with an RF communication device having one or more HMAs disposed on an inside surface of a window of a structure and the wireless signals are communicated, by electronic components disposed on the inside surface of the window, to a CPE device disposed inside the structure and which communicates the wireless signals to one or more wireless computing devices disposed inside the structure.

FIG. 2C shows a schematic view of wireless signal source 234 arranged as a base station in communication with RF communication device 248 that includes one or more HMAs disposed on an inside surface of a window of structure 236. Further, the wireless signals are communicated, by electronic components disposed on the inside surface of the window, to one or more UEs inside structure 236. The one or more UEs may include customer premises equipment 240, mobile UE device 242, and/or other wired or wireless devices (not shown). Also, inductive chargers, batteries, electrical outlets, or the like (not shown) may be used to provide electrical power to the various components of RF communication device 248 disposed on the interior surface of window 238.

Figure 2D:
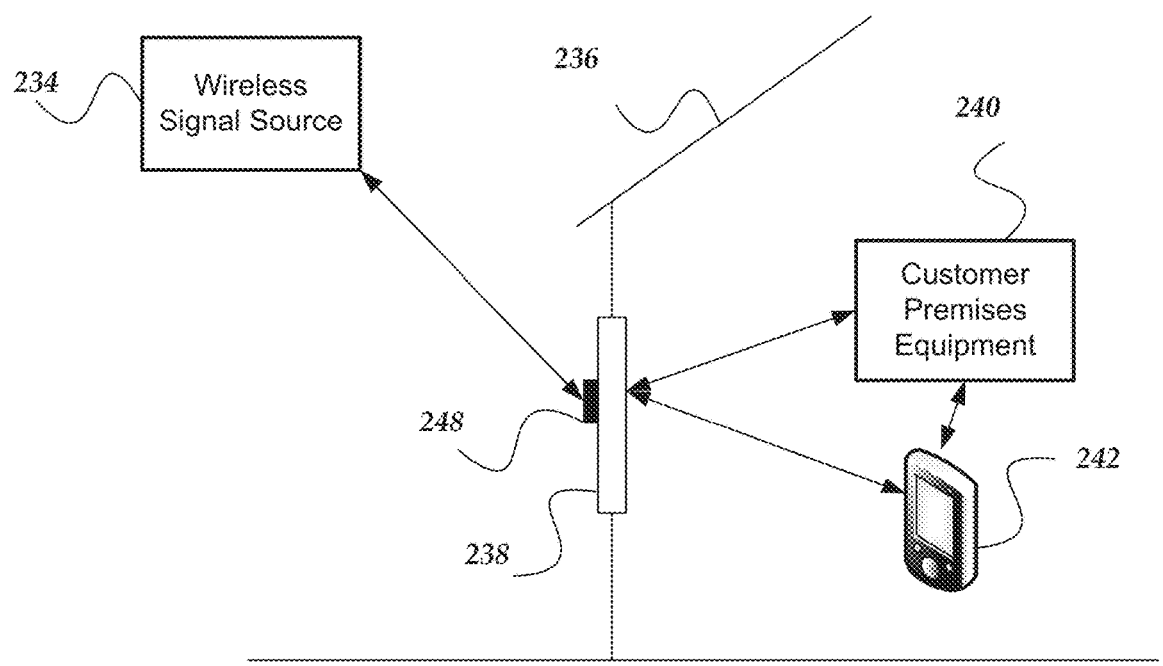
FIG. 2D illustrates a schematic view of a wireless signal base station communicating with an RF communication device having one or more HMAs disposed on an exterior surface of a window of a structure and the wireless signals are communicated, by electronic components disposed on the exterior surface of the window, to a CPE device disposed inside the structure and which communicates the wireless signal to one and one or more wireless computing devices disposed inside the structure.

FIG. 2D illustrates a schematic view of a wireless signal source arranged as a base station in communication with RF communication device 248 that includes one or more HMAs disposed on an exterior surface of window 238 of structure 236. Further, wireless signals are communicated, by electronic components disposed on the exterior surface of the window, to one or more UEs inside structure 236. The one or more UEs may include customer premises equipment 240, mobile UE device 242, and/or other wired or wireless devices (not shown). Also, inductive chargers, batteries, electrical outlets, or the like (not shown) may be used to provide electrical power to the various components of RF communication device 248 disposed on the exterior surface of window 238. Additionally, although not shown, RF communication device 248 may be disposed on an outside surface of an exterior wall of structure 236 so that wireless signals are similarly communicated to one or more UEs disposed inside the structure.

Figure 2E:
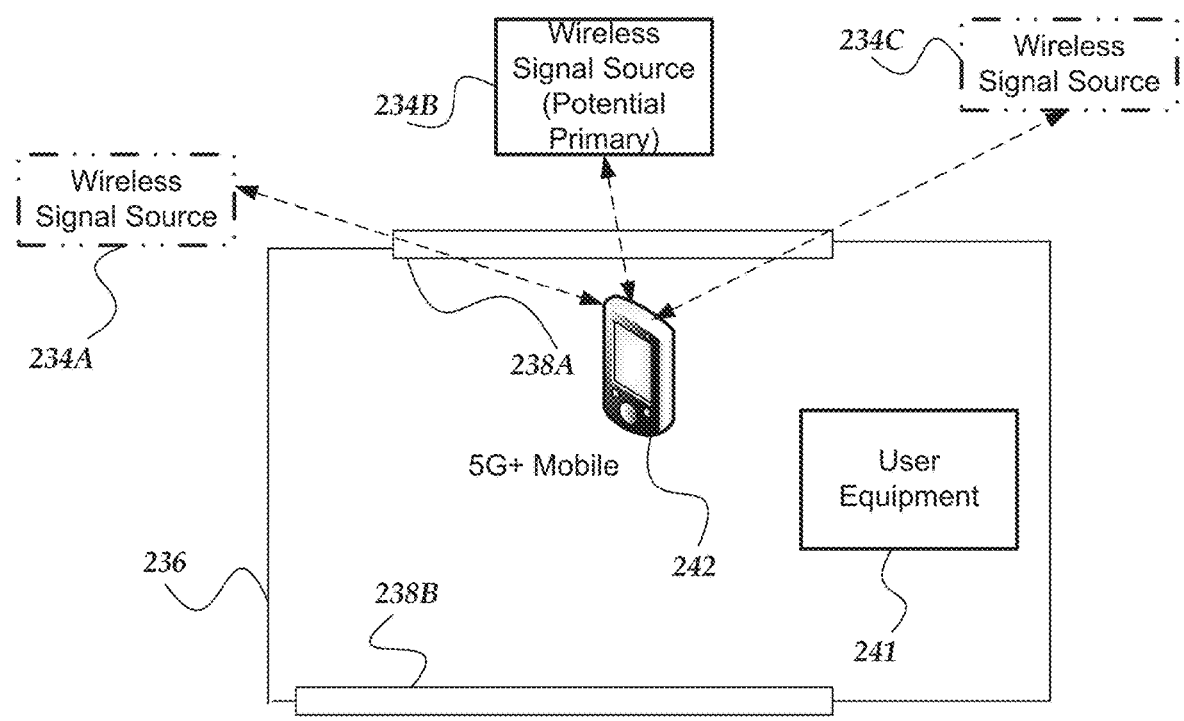
FIGS. 2E, 2F and 2G show schematic views of a plurality of wireless signal sources that are remotely located outside of windows of a structure, wherein a mobile UE device includes a modem capable of communication by 5G or higher (5G+) wireless communication protocols that is used to enable selection primary and secondary wireless signal sources.

FIG. 2E shows a schematic view of a plurality of wireless signal sources 234A-234C that are remotely located outside of window 238A of structure 236. One or more types of user equipment 241 are located inside structure 236 including mobile UE device 242 which includes a modem capable of communication by 5G or higher (5G+) wireless communication protocols. An application (not shown) executing on mobile UE device 242 employs a 5G+ modem to monitor and determine information for RF signals communicated with 5G or higher wireless communication protocols by wireless signal sources 234A-234C. The determined information and/or a relay of the RF signals are communicated/provided by mobile UE device 242 to one or more remote resources (not shown) that may include an install and activation engine, element managements systems engine, beam management systems engine, or the like. Based on the provided information and/or the relayed RF signals, the one or more remote resources provide an initial selection of wireless signal source 234B as a potential primary wireless signal source for further communication with an RF communication device that is not yet installed.

In one or more embodiments, the relayed RF signals, determined information and other provided information may include one or more of: location, heading of the RF communication device, echo raster scan information with corresponding mobile UE device key performance indicators (KPIs) and corresponding CPE KPIs; service disruptions, load balancing information, prior installation history, or the like.

Figure 2F:
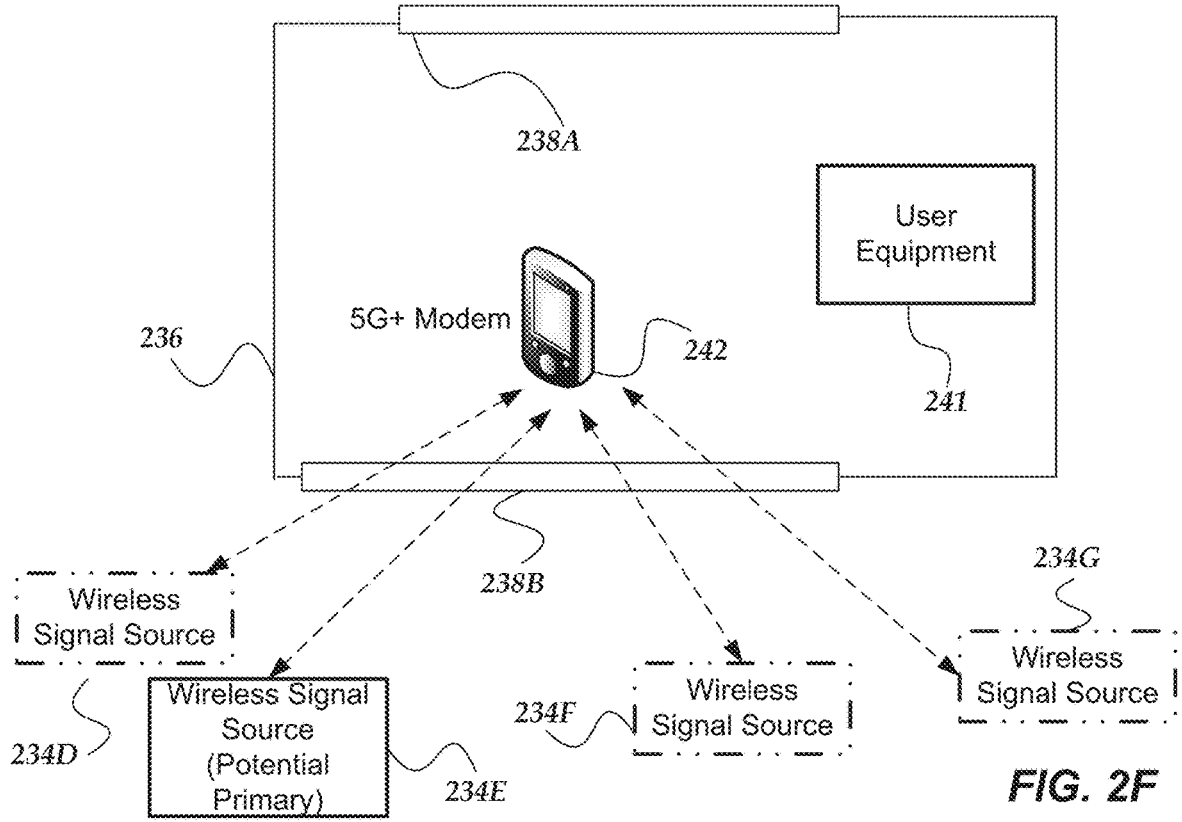

FIG. 2F illustrates a schematic view of a plurality of wireless signal sources 234D-234G that are remotely located outside of window 238B of structure 236. One or more types of user equipment 241 are located inside structure 236 including mobile UE device 242 which includes a modem capable of communication by 5G or higher (5G+) wireless communication protocols. An application (not shown) executing on mobile UE device 242 employs a 5G+ modem to monitor and determine information for RF signals communicated with 5G or higher wireless communication protocols by wireless signal sources 234D-234G. The determined information and/or a relay of the RF signals are communicated/provided by mobile UE device 242 to one or more remote resources (not shown) that may include an install and activation engine, element management systems engine, beam management systems engine, or the like. Based on the provided information, this engine provides an initial selection of wireless signal source 234E is selected as a potential primary wireless signal source for further communication with an RF communication device that is not yet installed.

Figure 2G:
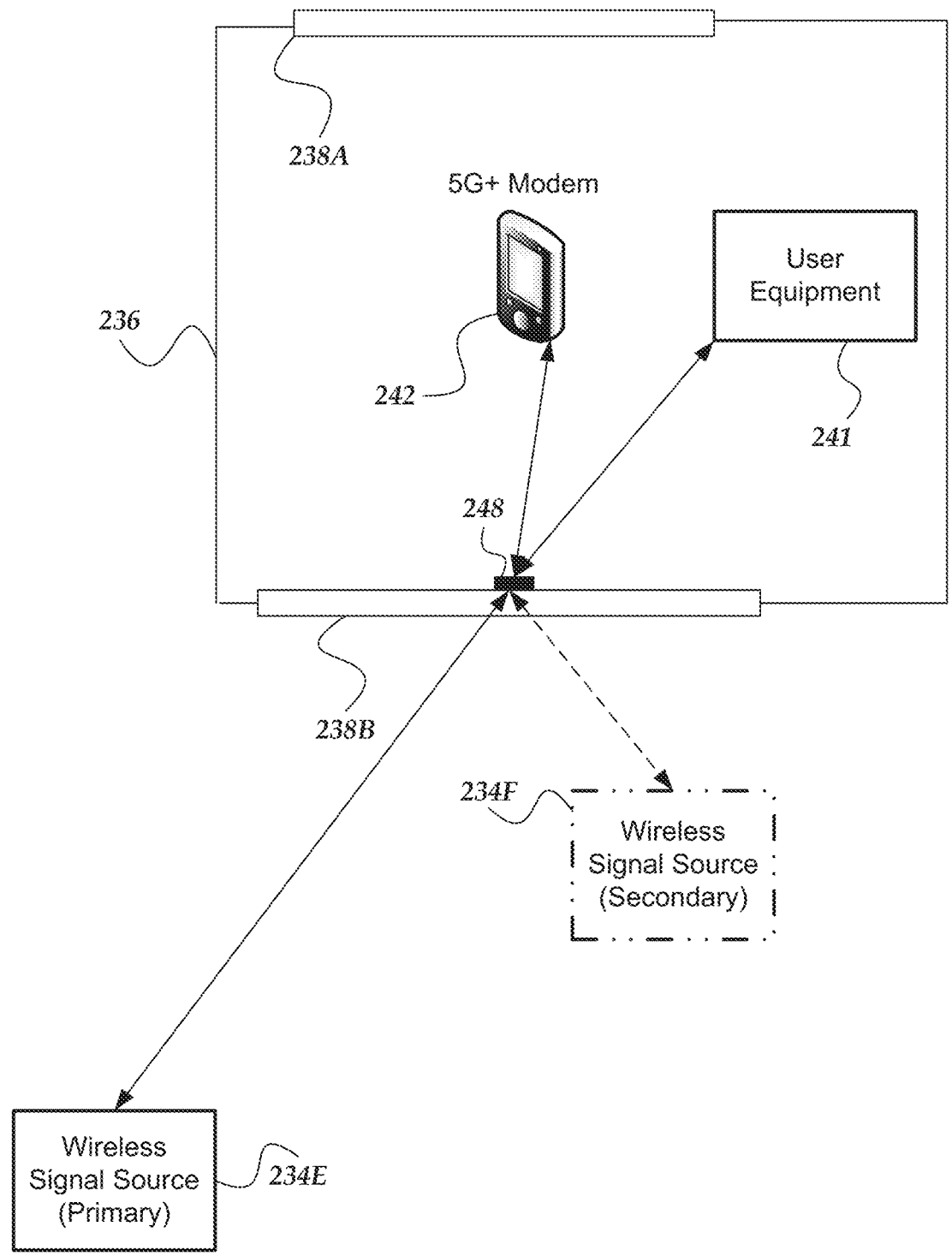

FIG. 2G illustrates a schematic view of a plurality of wireless signal sources 234E and 234F that are remotely located outside of window 238B of structure 236. One or more types of user equipment 241 are located inside structure 236 including mobile UE device 242 which includes a modem capable of communication by 5G or higher (5G+) wireless communication protocols. An application (not shown) executing on mobile UE device 242 employs a 5G+ modem to receive a selection of window 238B for installation of RF communication device 248 from one or more remote resources that may include the install and activation engine element management systems engine, beam management systems engine, or the like. Also, another selection is provided for wireless signal source 234E as the primary wireless signal source, and a further selection of wireless signal source 234F as a secondary (backup) wireless signal source. Further, a determination is made as to whether the relayed RF signals communicated by each wireless signal source are direct path signals or reflected signals for a remotely located wireless signal source.

Additionally, the selections of window 238B and wireless signal sources 234E and 234F are performed at least in part by the one or more remote resources which are based at least in part on one or more comparisons of one or more of the determined information for the relayed RF signals, direct path versus reflected determinations, or other information provided to the one or more remote resources.

Figure 2H:
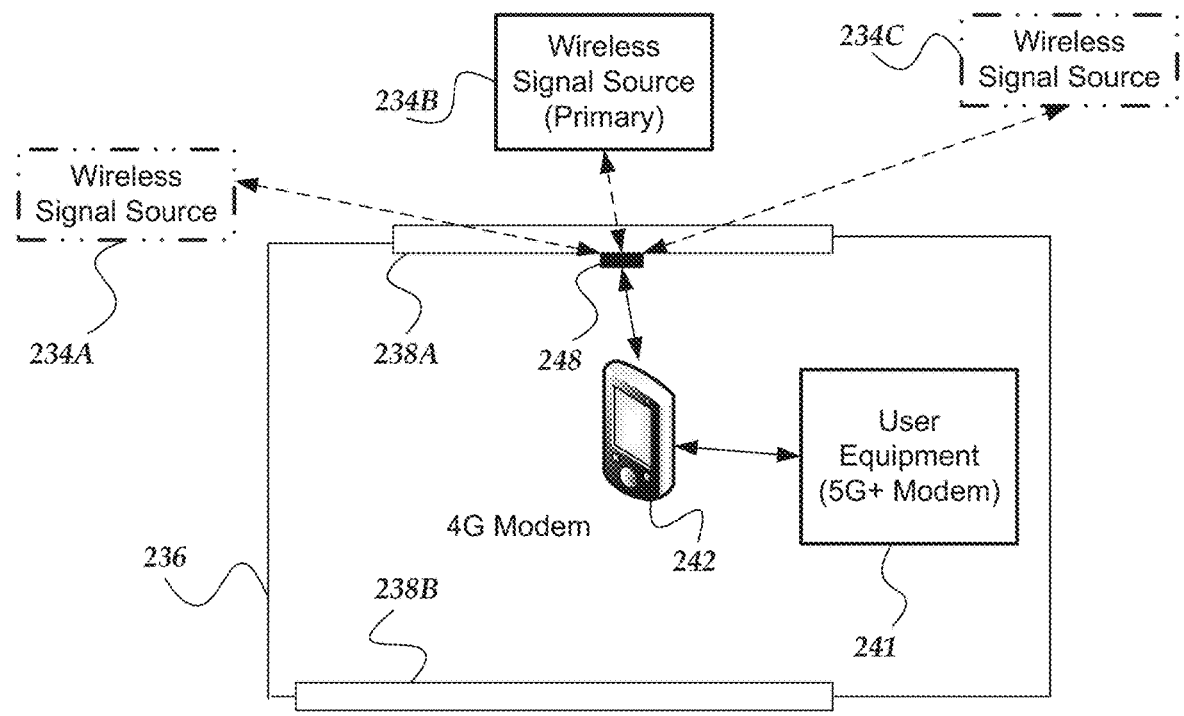
FIGS. 2H, 2I and 2J show schematic views of a plurality of wireless signal sources that are remotely located outside of windows of a structure, wherein a mobile UE device employs another UE device having a modem capable of communication by 5G or higher (5G+) wireless communication protocols to enable selection of primary and secondary wireless signal sources.

FIG. 2H shows a schematic view of a plurality of wireless signal sources 234A-234C that are remotely located outside of window 238A of structure 236. Mobile UE device 242 and another type of user equipment (UE) device 241 that include a modem capable of communication by 5G or higher (5G+) wireless communication protocols are both located inside structure 236. An application (not shown) executing on mobile UE device 242 employs the 5G+ modem included in UE device 241 to monitor and determine information for RF signals communicated with 5G or higher wireless communication protocols by wireless signal sources 234A-234C. The determined information and/or a relay of the RF signals are communicated/provided by mobile UE device 242 with the 5G+ modem of UE 241 to one or more remote resources (not shown) that may include an install and activation engine element management systems engine, beam management systems engine, or the like. Based on the determined information and/or relayed RF signals, the one or more remote resources provide an initial selection of wireless signal source 234B as a potential primary wireless signal source for further communication with an RF communication device that is not yet installed.

In one or more embodiments, the relayed RF signals, determined information and other provided information may include one or more of: location, heading of the RF communication device, echo raster scan information with corresponding mobile UE device key performance indicators (KPIs) and corresponding CPE KPIs; service disruptions, load balancing information, prior installation history, or the like.

Figure 2I:
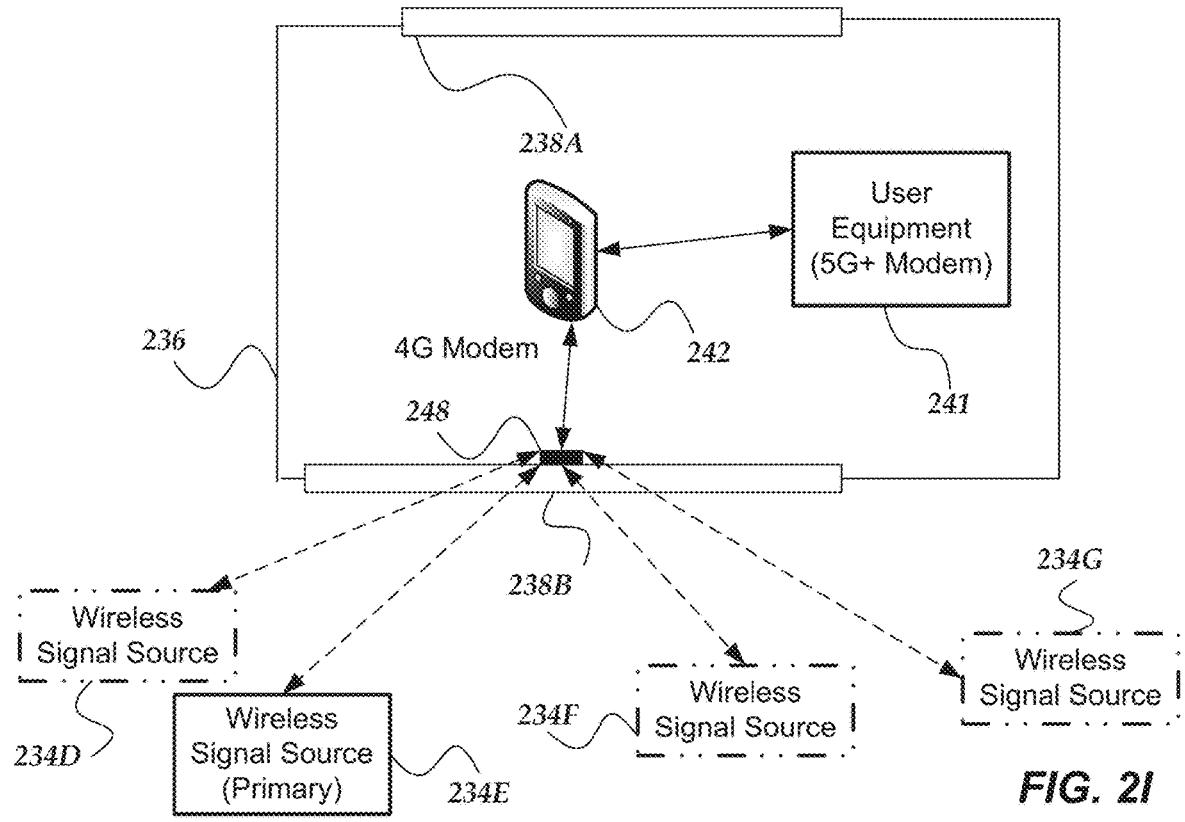

FIG. 2I illustrates a schematic view of a plurality of wireless signal sources 234D-234G that are remotely located outside of window 238B of structure 236. Mobile UE device 242 and another type of user equipment (UE) device 241 that include a modem capable of communication by 5G or higher (5G+) wireless communication protocols are both located inside structure 236. An application (not shown) executing on mobile UE device 242 employs the 5G+ modem included in UE device 241 to monitor and determine information for RF signals communicated with 5G or higher wireless communication protocols by wireless signal sources 234D-234G. The determined information and/or a relay of the RF signals are communicated by mobile UE device 242 with the 5G+ modem of UE 241 to one or more remote resources (not shown) that include an install and activation engine element management systems engine, beam management systems engine, or the like. Based on the determined information, the one or more remote resources provide an initial selection of wireless signal source 234E as a potential primary wireless signal source for further communication with an RF communication device that is not yet installed.

Figure 2J:
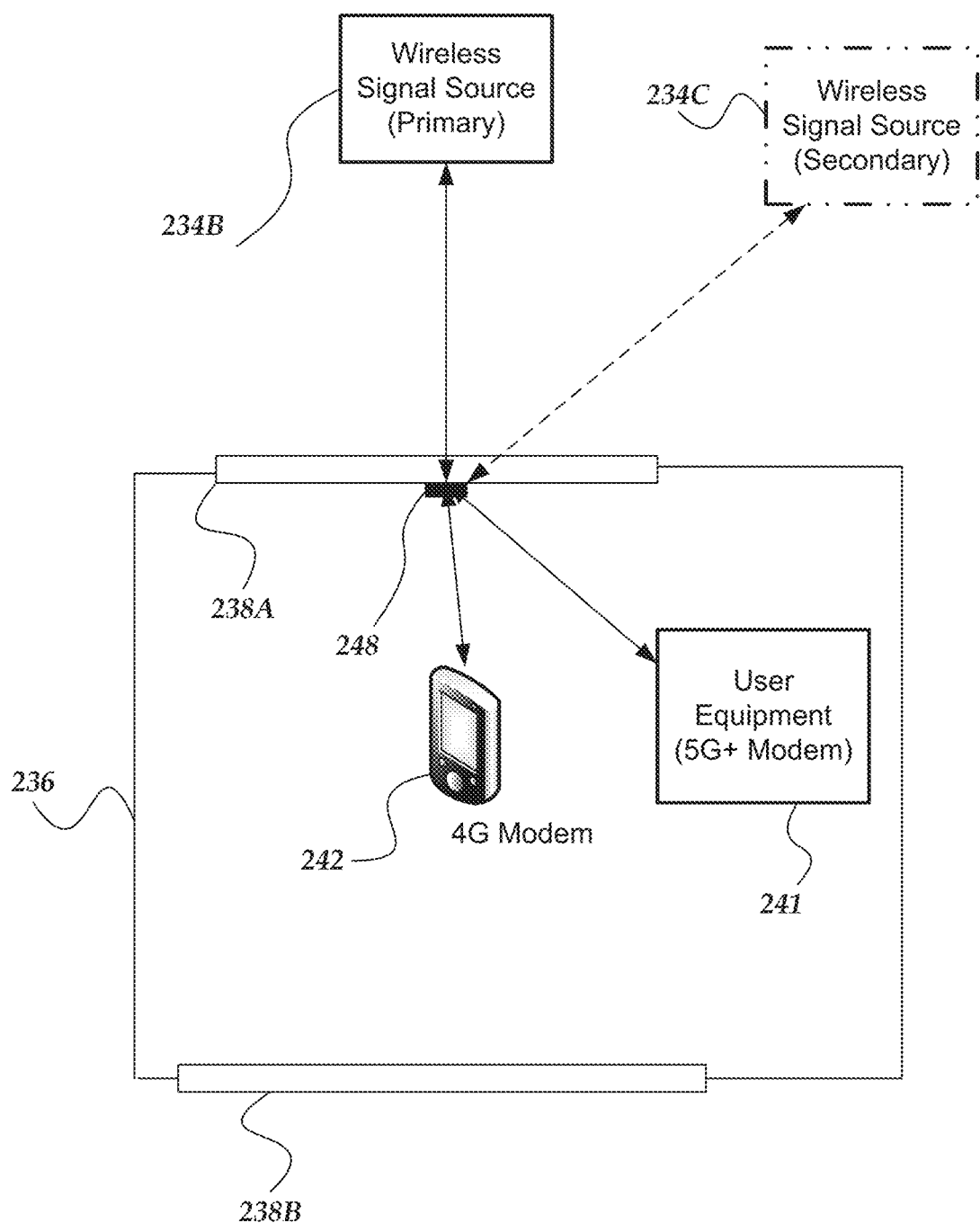

FIG. 2J illustrates a schematic view of a plurality of wireless signal sources 234E and 234F that are remotely located outside of window 238B of structure 236. Mobile UE device 242 and another type of user equipment (UE) device 241 that include a modem capable of communication by 5G or higher (5G+) wireless communication protocols are both located inside structure 236. An application (not shown) executing on mobile UE device 242 employs the 5G+ modem included in UE device 241 to receive a selection of window 238B for installation of RF communication device 248 from one or more remote resources (not shown) that include the install and activation engine element management systems engine, beam management systems engine, or the like. Also, another selection is provided for wireless signal source 234E as the primary wireless signal source, and a further selection of wireless signal source 234F as a secondary (backup) wireless signal source. The one or more remote resources provide selections of window 238B and wireless signal sources 234E and 234F based in part on one or more comparisons of determined information for relayed RF signals, direct path versus reflected determinations, or other provided information.

Figure 2K:
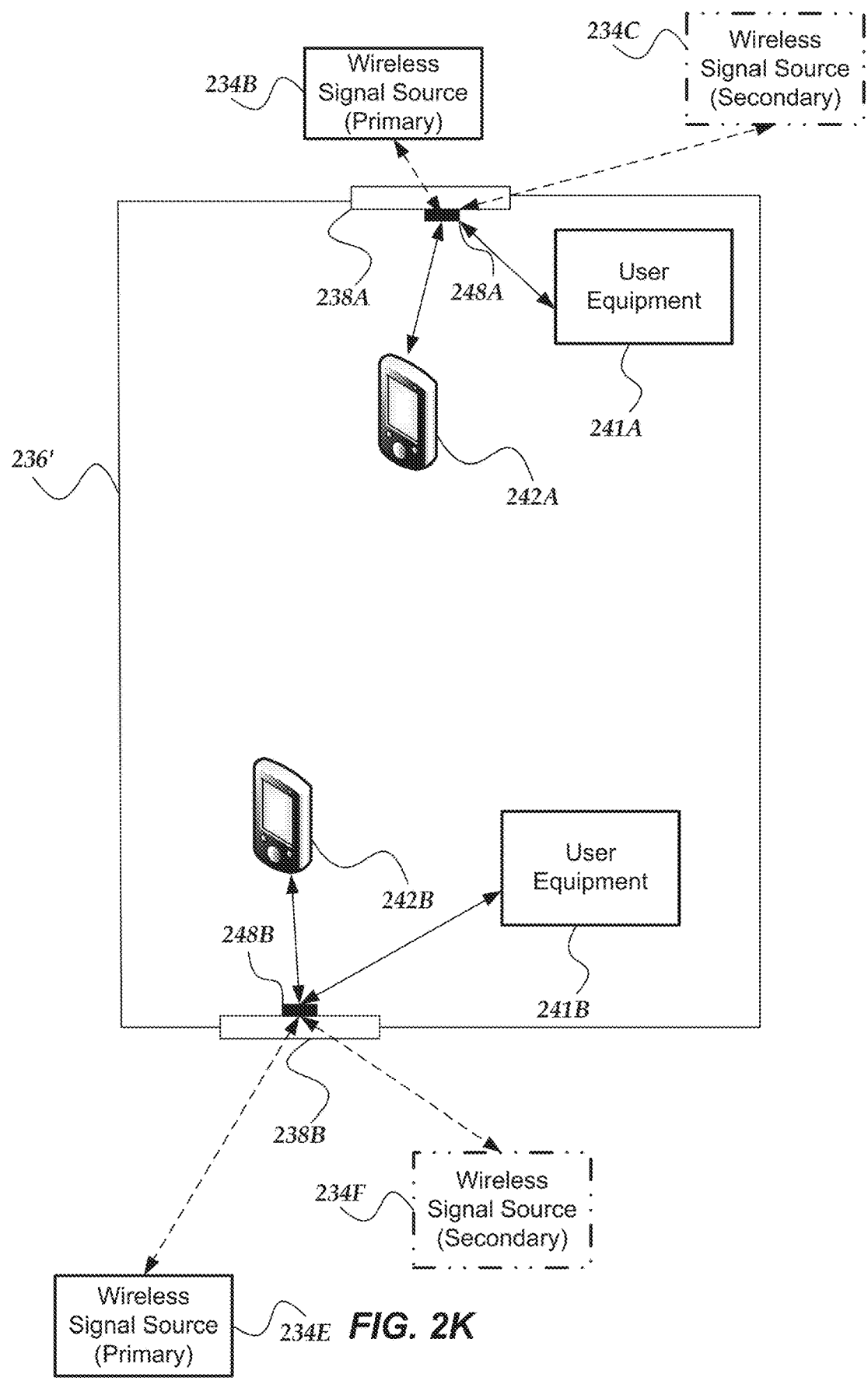
FIG. 2K shows a schematic view of a plurality of wireless signal sources that are remotely located outside of two separate windows of a structure, wherein two separate mobile UE devices are used to enable selection of two sets of primary and secondary wireless signal sources for communication with two separate RF communication devices.

FIG. 2K shows a schematic view of structure 236' that is arranged with two separate RF communication devices 248A and 248B that are respectively installed on windows 238A and 238B to compensate for bandwidth, load balancing and distances inside a physically large structure with multiple users that may be associated with two or more different wireless carriers. The large physical size of structure 236' can create attenuation of RF wireless signals communicated inside the structure that limits access to UE devices, e.g., a stadium, factory, or large multi-family apartment building. Also, a total number of UE devices inside a large structure may create load balancing and low bandwidth issues. Further, different users or groups of users within the structure may be associated with two or more different wireless carriers.

For larger structure 236', two different clusters of one or more UE devices 241A and 241B are located at different locations inside the structure Also, separate install and activation applications (not shown) executing on mobile UE devices 242A and 242B employ 5G+ modems to receive selections of windows 238A and 238B for installation of RF communication devices 248A and 248B from one or more remote resources that may include an install and activation engine element management systems engine, beam management systems engine, or the like. Also, other selections are provided for wireless signal sources 234B and 234E as the primary wireless signal sources, and further selections of wireless signal sources 234C and 234F as secondary (backup) wireless signal sources. The one or more remote resources provide selections of windows 238A and 238B and wireless signal sources 234B, 234C, 234E and 234F based in part on one or more comparisons of one or more of determined information for relayed RF signals, direct path versus reflected determinations, or other provided information.

Additionally, although not shown in FIGS. 2B-2K, substantially the same actions may be performed when a window is unavailable in a structure to provide access to RF wireless signal communication between one or more remotely located wireless signal sources and an RF communication device at the structure. In one or more embodiments for at least the no available window scenario, the RF communication device may be positioned on an interior surface of an exterior wall of a structure. Alternatively, the RF communication device may by positioned on an exterior surface of an exterior wall of the structure. Also, the RF communication device may be positioned on a mounting bracket, such as a pole, that may be free standing outside the structure or positioned on a mounting bracket attached to an exterior surface wall of an exterior wall of the structure. In one or more of the no available window embodiments, substantially the same process is preformed to select the primary and secondary wireless signal sources for the RF communication device.

Illustrative Computer

Figure 3A:
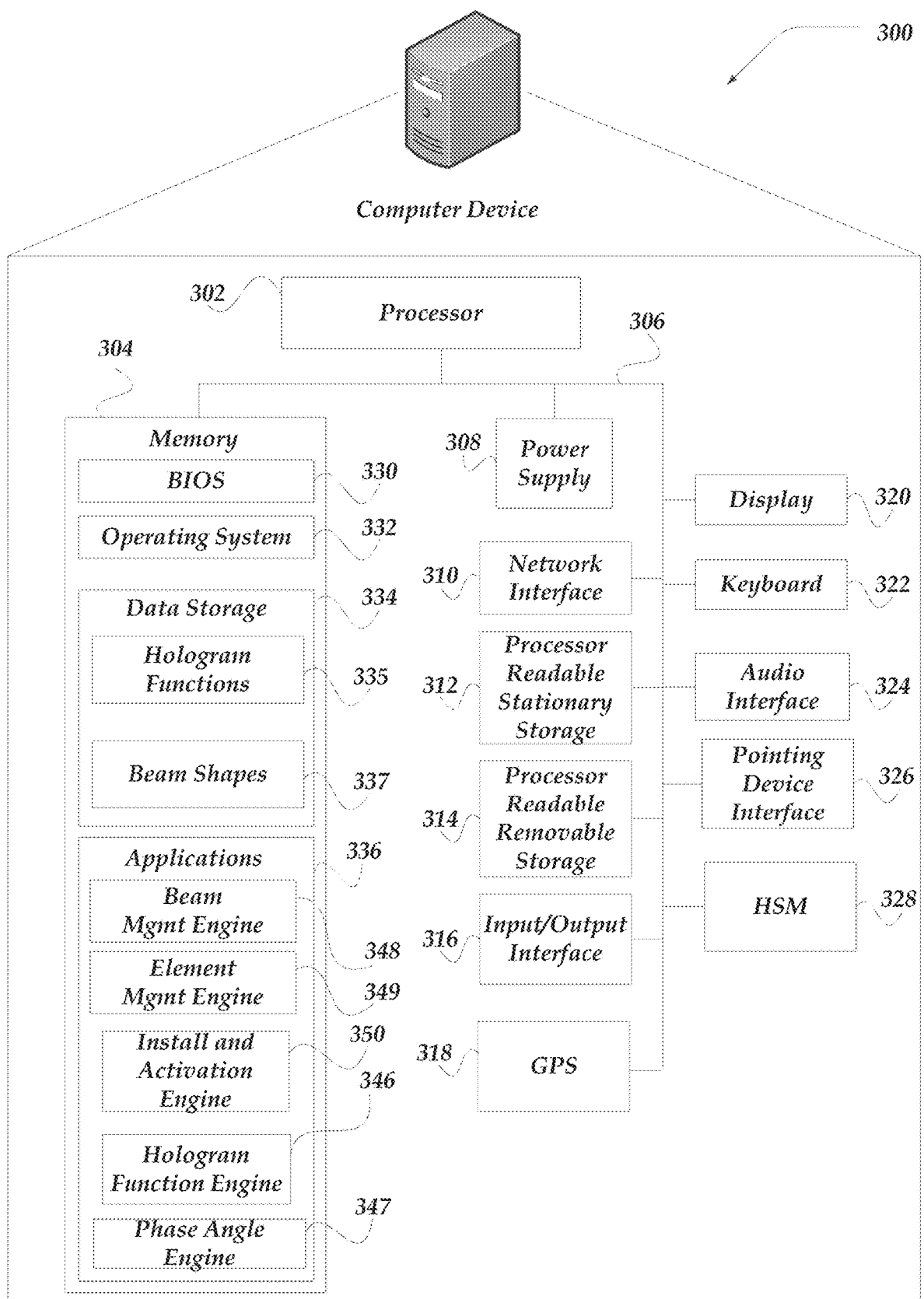
FIG. 3A shows an embodiment of one or more exemplary computer devices that may be included in a system such as that shown in FIG. 2A.

FIG. 3A shows one embodiment of an exemplary computer device 300 that may be included in an exemplary system implementing one or more of the various embodiments. Computer device 300 may include many more or less components than those shown in FIG. 3. However, the components shown are sufficient to disclose an illustrative embodiment for practicing these innovations. Computer device 300 may include a desktop computer, a laptop computer, a server computer, a client computer, mobile device, and the like. Computer device 300 may represent, for example, one embodiment of one or more of a laptop computer, smartphone/tablet, computer device, controller of one or more HMAs, mobile device or may be part of the network operations center.

As shown in FIG. 3A, computer device 300 includes one or more processors 302 that may be in communication with one or more memories 304 via a bus 306. In some embodiments, one or more processors 302 may be comprised of one or more hardware processors, one or more processor cores, or one or more virtual processors. In some cases, one or more of the one or more processors may be specialized processors or electronic circuits particularly designed to perform one or more specialized actions, such as, those described herein. Computer device 300 also includes a power supply 308, network interface 310, non-transitory processor-readable stationary storage device 312 for storing data and instructions, non-transitory processor-readable removable storage device 314 for storing data and instructions, input/output interface 316, GPS transceiver 318, display 320, keyboard 322, audio interface 324, pointing device interface 326, wireless interface 328, although a computer device 300 may include fewer or more components than those illustrated in FIG. 3 and described herein. Power supply 308 provides power to computer device 300.

Network interface 310 includes circuitry for coupling computer device 300 to one or more wired and/or wireless networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), Long Term Evolution (LTE), 5G, 4G, 3G, 2G, user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (MC). Computer device 300 may optionally communicate with a remote base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of computer device 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Computer device 300 may also comprise input/output interface 316 for communicating with external devices or computers not shown in FIG. 3. Input/output interface 316 can utilize one or more wired or wireless communication technologies, such as USB™, Firewire™, Wi-Fi™, WiMax™, Thunderbolt™, Infrared, Bluetooth™, Zigbee™, ANT™, Bixby™, serial port, parallel port, and the like.

Also, input/output interface 316 may also include one or more sensors for determining geolocation information (e.g., global positioning system—GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to computer device 300. Human interface components can be physically separate from computer device 300, allowing for remote input and/or output to computer device 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of computer device 300. The memory also stores an operating system 332 for controlling the operation of computer device 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by computer device 300 to store, among other things, applications 336 and/or other data. For example, data storage 334 may also be employed to store information that describes various capabilities of computer device 300. In one or more of the various embodiments, data storage 334 may store hologram function information 335 or beam shape information 337. The hologram function information 335 or beam shape information 337 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of computer device 300, including, but not limited to, non-transitory media inside non-transitory processor-readable stationary storage device 312, processor-readable removable storage device 314, or various other computer-readable storage devices within computer device 300, or even external to computer device 300.

Applications 336 may include computer executable instructions which, if executed by computer device 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include hologram function engine 346, phase angle engine 347, beam management engine 348, element management engine 349, and install and activation engine 350 that performs actions further described below in FIGS. 5A-5D. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, specialized applications such as hologram function engine 346, phase angle engine 347, beam management engine 348, element management engine 349 and/or install and activation engine 350 may be operative in a networked computing environment to perform specialized actions described herein. In one or more of the various embodiments, these applications, and others, may be executing within virtual machines and/or virtual servers that may be managed in a networked environment such as a local network, wide area network, or cloud-based based computing environment. In one or more of the various embodiments, in this context the applications may flow from one physical computer device within the cloud-based environment to another depending on performance and scaling considerations automatically managed by the cloud computing environment. Likewise, in one or more of the various embodiments, virtual machines and/or virtual servers dedicated to the hologram function engine 346, phase angle engine 347, beam management engine 348, element management engine 349 and/or install and activation engine 350 may be provisioned and decommissioned automatically.

Also, in one or more of the various embodiments, the hologram function engine 346, phase angle engine 347, beam management engine 348, element management engine 349, install and activation engine 350, or the like may be located in virtual servers running in a networked computing environment rather than being tied to one or more specific physical computer devices.

Further, computer device 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 328 may be a stand-alone computer device, in other cases, HSM 328 may be arranged as a hardware card that may be installed in a computer device.

Additionally, in one or more embodiments (not shown in the figures), the computer device may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the computer device may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Client Computer

Figure 3B:
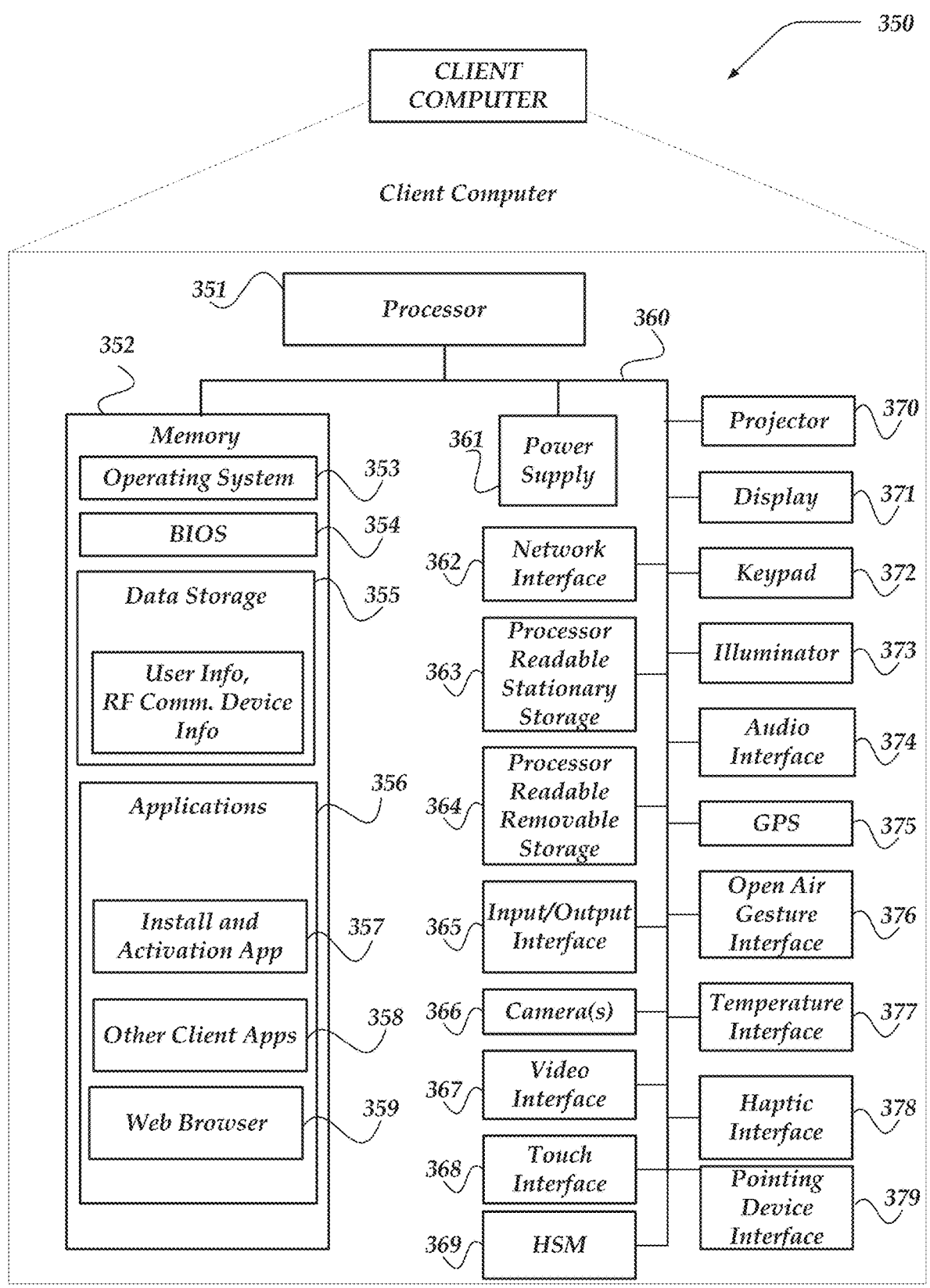
FIG. 3B illustrates an embodiment of an exemplary client computer device.

FIG. 3B shows one embodiment of client computer 350 that may include many more or less components than those shown. Client computer 350 may represent, for example, at least one embodiment of mobile computers or client computers shown in FIG. 2A.

Client computer 350 may include processor 351 in communication with memory 352 via bus 360. Client computer 350 may also include power supply 361, network interface 362, audio interface 374, display 371, keypad 372, illuminator 373, video interface 367, input/output interface 365, haptic interface 378, global positioning systems (GPS) receiver 375, open air gesture interface 376, temperature interface 377, camera(s) 367, projector 370, pointing device interface 379, processor-readable stationary storage device 363, and processor-readable removable storage device 364. Client computer 350 may optionally communicate with a base station (not shown), or directly with another computer. Power supply 361 may provide power to client computer 350. A rechargeable or non-rechargeable battery may be used to provide power. The power may also be provided by an external power source, such as an AC adapter or a powered docking cradle that supplements or recharges the battery.

Network interface 362 includes circuitry for coupling client computer 350 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 362 is sometimes known as a transceiver, transceiving device, or network interface card (MC).

Audio interface 374 may be arranged to produce and receive audio signals such as the sound of a human voice. For example, audio interface 374 may be coupled to a speaker and microphone (not shown) to enable telecommunication with others or generate an audio acknowledgement for some action. A microphone in audio interface 374 can also be used for input to or control of client computer 350, e.g., using voice recognition, detecting touch based on sound, and the like.

Display 371 may be a liquid crystal display (LCD), gas plasma, electronic ink, light emitting diode (LED), Organic LED (OLED) or any other type of light reflective or light transmissive display that can be used with a computer. Display 371 may also include a touch interface 368 arranged to receive input from an object such as a stylus or a digit from a human hand, and may use resistive, capacitive, surface acoustic wave (SAW), infrared, radar, or other technologies to sense touch or gestures.

Projector 370 may be a remote handheld projector or an integrated projector that is capable of projecting an image on a remote wall or any other reflective object such as a remote screen.

Video interface 367 may be arranged to capture video images, such as a still photo, a video segment, an infrared video, or the like. For example, video interface 367 may be coupled to a digital video camera, a web-camera, or the like. Video interface 367 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 372 may comprise any input device arranged to receive input from a user. For example, keypad 372 may include a push button numeric dial, or a keyboard. Keypad 372 may also include command buttons that are associated with selecting and sending images.

Illuminator 373 may provide a status indication or provide light. Illuminator 373 may remain active for specific periods of time or in response to event messages. For example, when illuminator 373 is active, it may backlight the buttons on keypad 372 and stay on while the client computer is powered. Also, illuminator 373 may backlight these buttons in various patterns when particular actions are performed, such as dialing another client computer. Illuminator 373 may also enable light sources positioned within a transparent or translucent case of the client computer to illuminate in response to actions.

Further, client computer 350 may also comprise hardware security module (HSM) 369 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 369 may be a stand-alone computer, in other cases, HSM 369 may be arranged as a hardware card that may be added to a client computer.

Client computer 350 may also comprise input/output interface 365 for communicating with external peripheral devices or other computers such as other client computers and network computers. The peripheral devices may include an audio headset, virtual reality headsets, display screen glasses, remote speaker system, remote speaker and microphone system, and the like. Input/output interface 365 can utilize one or more technologies, such as Universal Serial Bus (USB), Infrared, WiFi, WiMax, Bluetooth™, and the like.

Input/output interface 365 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 350.

Haptic interface 378 may be arranged to provide tactile feedback to a user of the client computer. For example, the haptic interface 378 may be employed to vibrate client computer 350 in a particular way when another user of a computer is calling. Temperature interface 377 may be used to provide a temperature measurement input or a temperature changing output to a user of client computer 350. Open air gesture interface 376 may sense physical gestures of a user of client computer 350, for example, by using single or stereo video cameras, radar, a gyroscopic sensor inside a computer held or worn by the user, or the like. One or more cameras 366 may be used by an application to employ facial recognition methods to identify a user, track the user's physical eye movements, or take pictures (images) or videos.

GPS device 375 can determine the physical coordinates of client computer 350 on the surface of the Earth, which typically outputs a location as latitude and longitude values. GPS device 375 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 350 on the surface of the Earth. It is understood that GPS device 375 can employ a gyroscope to determine an orientation and/or an accelerometer to determine movement of the client computer 350. In one or more embodiment, however, client computer 350 may, through other components, provide other information that may be employed to determine a physical location of the client computer, including for example, a Media Access Control (MAC) address, IP address, and the like.

Human interface components can be peripheral devices that are physically separate from client computer 350, allowing for remote input or output to client computer 350. For example, information routed as described here through human interface components such as display 371 or keypad 372 can instead be routed through network interface 362 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Figure 3C:
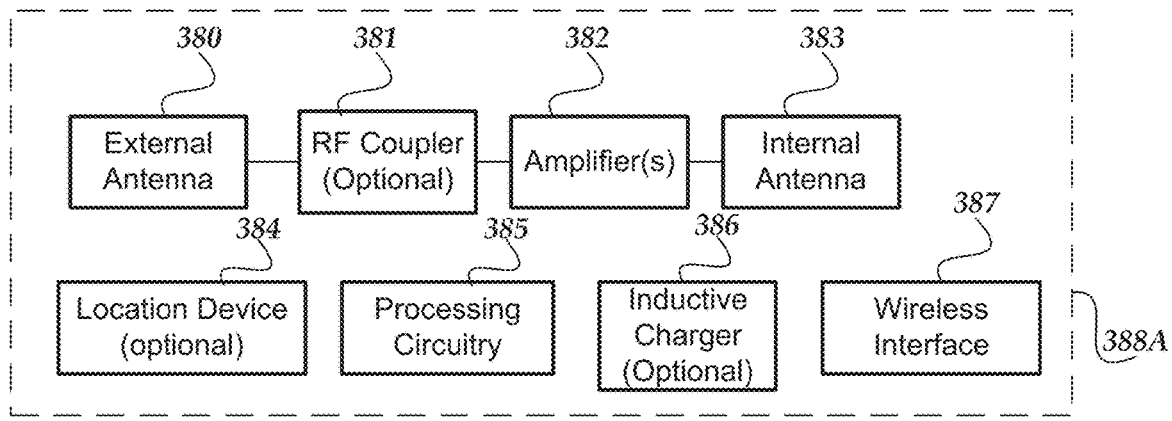
FIG. 3C shows an embodiment of an exemplary schematic for an RF communication device that is separate from a customer premises equipment device(s)
Figure 3D:
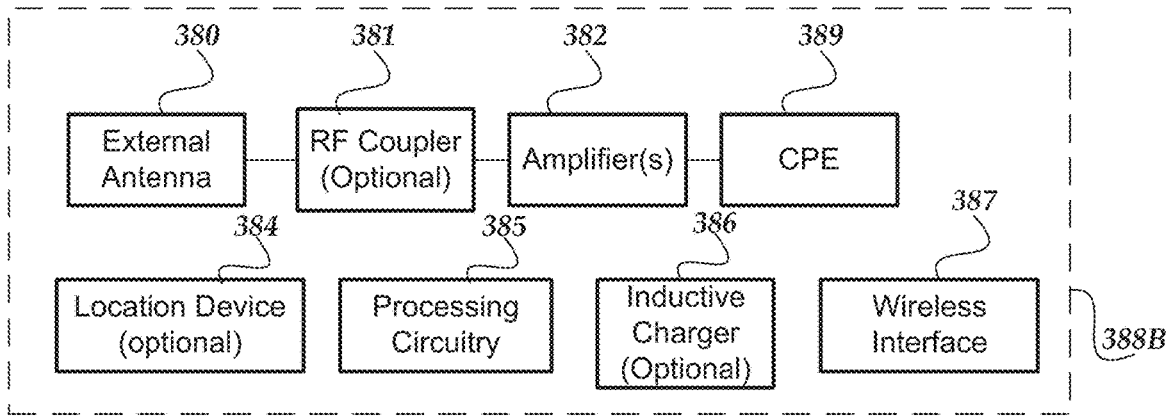
FIG. 3D illustrates an embodiment of an exemplary schematic for an Rf communication device that includes a customer premises equipment device(s)

Client computer 350 may include install and activation app 357 that may be configured to remotely provide key performance indicators (KPIs) of the performance of an RF communication device such as shown in FIGS. 3C and 3D. The KPIs may include upload bandwidth, download bandwidth, strength of wireless signals communicated with a remote wireless base station, reflector, base station proxy, or customer premises equipment. Also, install and activation app 357 may authorize and enable different types of users (e.g., technicians, customers, and the like) to use a displayed interface to quickly identify and troubleshoot technical problems, assist in orientation of the RF communication device to provide an optimal wireless communication link with a remote wireless base station, and the like. The app may also enable adjustment of particular performance parameters to improve one or more aspects of the operation of the RF communication device. In one or more embodiments, install and activation application 357 may employ Bluetooth, wifi, or any other wireless or wired communication link to communicate with the RF communication device.

Client computer 350 may include web browser application 359 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 352 may include RAM, ROM, or other types of memory. Memory 352 illustrates an example of computer-readable storage media (devices) for storage of information such as computer-readable instructions, data structures, program modules or other data. Memory 352 may store BIOS 354 for controlling low-level operation of client computer 350. The memory may also store operating system 353 for controlling the operation of client computer 350. It will be appreciated that this component may include a general-purpose operating system such as a version of UNIX, or LINUX™, or a specialized client computer communication operating system such as Windows Phone™, Apple iOS™ or the Symbian® operating system. The operating system may include, or interface with a Java virtual machine module that enables control of hardware components or operating system operations via Java application programs.

Memory 352 may further include one or more data storage 355, which can be utilized by client computer 350 to store, among other things, applications 356 or other data. For example, data storage 355 may also be employed to store information that describes various capabilities of client computer 350. The information may then be provided to another device or computer based on any of a variety of methods, including being sent as part of a header during a communication, sent upon request, or the like. Data storage 355 may also be employed to store social networking information including address books, buddy lists, aliases, user profile information, or the like. Data storage 355 may further include program code, data, algorithms, and the like, for use by a processor, such as processor 351 to execute and perform actions. In one embodiment, at least some of data storage 355 might also be stored on another component of client computer 350, including, but not limited to, non-transitory processor-readable removable storage device 364, processor-readable stationary storage device 363, or even external to the client computer.

Applications 356 may include computer executable instructions which, when executed by client computer 350, transmit, receive, or otherwise process instructions and data. Applications 356 may include, for example, install and activation application 357, other client applications 358, web browser 359, or the like. Client computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 350 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Exemplary Schematics

FIG. 3C shows an embodiment of an exemplary schematic for RF communication device 388A that is separate from a CPE device (not shown). As discussed above, the RF communication device 388A may be configured with all of its major components located on an outside surface of a barrier, all of the components located on an inside surface of the barrier, and a portion of the RF communication device's components that include external antenna 380 located on the barrier's outside surface and another portion of these components that include internal antenna 383 located on the barrier's inside surface.

In one or more embodiments, external antenna 380 employs a scanning array antenna, such as an HMA, to communicate upload and download RF signals with a remotely located wireless base station (not shown). When RF communication device 388A is configured to be located on the inside surface of a barrier, such as a glass window, external antenna 380 is positioned to communicate the upload and download RF signals through the glass barrier to the remote wireless base station.

In one or more exemplary embodiments, external antenna 380 may adjust an HMA waveform employed by the HMA to compensate a decrease in gain caused by the scan impedance of the glass window during communication through the glass window of the upload and download RF signals with the remote wireless base station. The scan impedance may be caused by one or more factors, including thickness of glass, index of refraction of the glass, layers of the glass, coatings on the glass, or the like. In one or more embodiments, the scan impedance compensation includes detecting a direction of the HMA waveform to provide the strongest RF signal communication with the remote wireless base station, and then employing the HMA to adjust the scan impedance of the wave front of the radiated RF signal. In one or more embodiments, the bias voltage to one or more varactors that control scattering elements of the HMA may be adjusted to increase the gain of the communicated RF signals.

In one or more embodiments, internal antenna 383 may be configured as an array of patch antennas to communicate the upload and download RF signals towards the CPE. However, in one or more embodiments, internal antenna 383 may be configured with an HMA instead of the patch antenna array to communicate the upload and download RF signals to a remotely located CPE across relatively long distances such as found in stadiums, factories, assembly buildings, concert halls, or the like. Also, one or more other RF communication devices may be arranged inside the structure to operate as a relay for communication of RF signals, or the other RF communication devices may be arranged to operate as a reflector for communicating RF signals. In this way, a distance may be extended for communication of the upload and download RF signals inside a large structure to reach remotely located UEs such as CPEs and wireless communication devices. Additionally, in one or more embodiments, the UEs may include a beam forming antenna, e.g., an HMA, to communicate upload and download RF communication signals with the RF communication device.

Wireless interface 387 may be employed to perform various functions with one or more different types of one or more different wireless communication protocols for wireless communication, such as Bluetooth, Bluetooth LE, Zigbee, WiFi, LTE, CDMA, GSM, TDMA, or the like. Further, in one or more embodiments, a webpage and/or an application, such as an install and activation app, may employ wireless interface 387 to provide different types of security, controls, and/or information regarding the RF communication device 388A. The information may include metrics, notifications, troubleshooting tips, software updates, strength of upload and download RF signal, alerts, restart controls, RF signal scanning controls, user permissions, metrics, or the like. In one or more embodiments, wireless interface 387 may be employed to establish an inband wireless communication channel between a UE, such as a CPE, and RF communication device 388A. In another embodiment, wireless interface 387 may be employed to establish an out of band wireless communication channel between a technician and RF communication device 388A. Also, in yet another embodiment, wireless interface 387 may be employed to establish an out of band wireless communication with one or more applications, e.g., an installation and activation engine, beam management system engines, element management system engines, network operations centers, data centers, wireless base stations, or the like.

In one or more embodiments, RF coupler 381 may optionally be included to communicate the upload and download RF signals through a barrier, such as a glass window, when RF communication device 388A is physically located on an outside surface of the barrier or one portion of the RF communication device's components are located on the outside surface and another portion of the RF communication device's components are located on the inside surface of the barrier. However, in one or more embodiments when RF communication device 388A is entirely located on an inside surface of a barrier, then RF coupler 381 may not be included with the RF communication device.

In one or more embodiments, location device 384 may optionally be included with RF communication device 388A. Location device 384 may include a gyroscope, accelerometer, GPS device, and the like to detect an orientation, movement, and/or location of RF communication device 388A. In one or more embodiments, location device 384 may be employed by a technician or user to orient a pose for installation of RF communication device 388A in such a way as to optimize communication of upload and download RF signals with a remotely located wireless signal source such as a base station.

In one or more embodiments, inductive charger 386 may be optionally included to provide electrical power when RF communication device 388A is physically located on an outside surface of the barrier or one portion of the RF communication device's components are located on the outside surface and another portion of the RF communication device's components are located on the inside surface of the barrier. Although not shown, in one or more embodiments, one or more solar panels may be employed to provide electrical power to RF communication device 388A. Further, in one or more embodiments, when RF communication device 388A is entirely positioned on an inside surface of a barrier, electrical power may be provided by a battery and/or directly by an electrical outlet located inside a structure.

In one or more embodiments, processing components 385 are employed to control and/or manage operation of RF communication device 388A and one or all of the components included with the RF communication device. In one or more embodiments, processing circuitry 385 includes one or more of a processor, memory, application specific integrated circuit (ASIC), Field Programmable Gate Array (FPGA), or the like.

Also, in one or more embodiments, amplifier 382 may include a bi-static amplifier that simultaneously provides continuous and separate gains to upload RF wireless signals and download RF wireless signals. The bi-static amplifier is configured to employ separate upload and download amplifiers to separately provide a gain to the upload RF wireless signal as it is radiated by the exterior antenna and another gain to the download RF wireless signal as it is radiated by the interior antenna to the UEs inside the structure such as a CPE and other wireless communication devices. Also, in yet other embodiments, the bi-directional amplifier provides separate gains to the upload and download RF wireless signals by isolating and timing the communication of these upload and download RF wireless signals.

FIG. 3D illustrates an embodiment of an exemplary schematic for RF communication device 388B that includes CPE 389. Although not shown, amplifier 382 may be configured to provide gain for the upload RF wireless signal and not provide gain to the download RF wireless signal because CPE 389 may be configured to receive the download RF signal directly from external antenna 380. Also, an internal antenna would not be included as a component of RF communication device 388B. Additionally, external antenna 380, RF coupler 381, location device 384, processing circuitry 385, inductive charger 386 and wireless interface 387 are configured substantially the same as discussed above for RF communication device 388A and as shown in FIG. 3C.

Figure 3E:
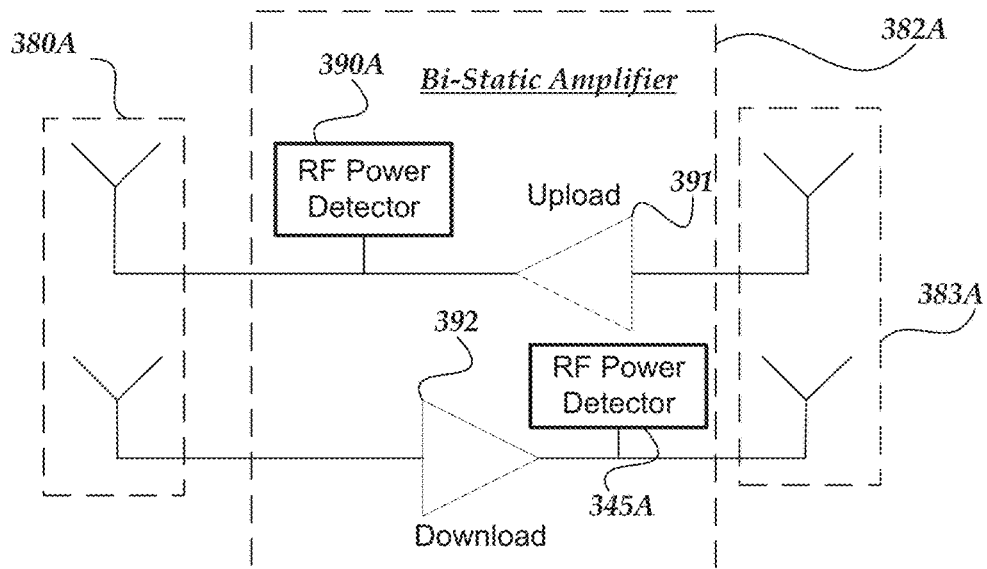
FIG. 3E shows an embodiment of an exemplary schematic for a bistatic amplifier that is employed by an RF communication device.

FIG. 3E shows an embodiment of an exemplary schematic for bistatic amplifier 382A that is employed by an RF communication device. External antenna 380A is arranged to simultaneously communicate upload and download RF wireless signals with a remotely located wireless base station (not shown). Also, internal antenna 383A is arranged to simultaneously communicate upload and download RF wireless signals with other user equipment devices, such as a CPE (not shown). Upload amplifier 391A is arranged to provide gain for the upload RF wireless signal and download amplifier 392A is arranged to provide gain for the download RF wireless signal. Additionally, RF power detector 390A is arranged to monitor a value of the power of the upload RF wireless signal. Also, RF power detector 345A is arranged to monitor a value of the power of the download RF wireless signal.

Exemplary Cover Device

Figure 4A:
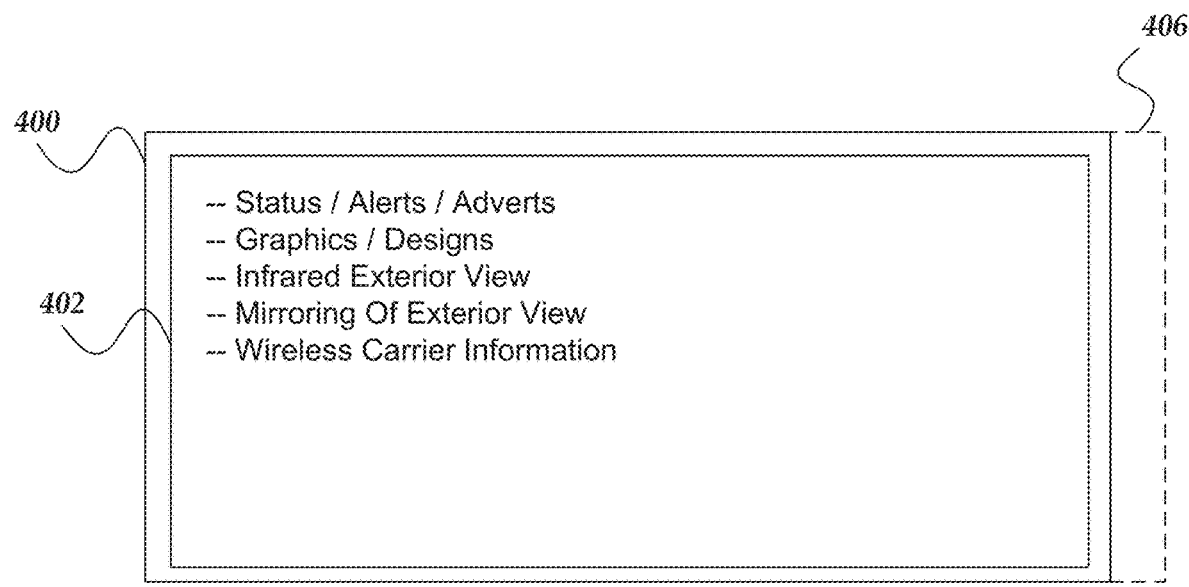
FIG. 4A illustrates a top view of a display mounted a top surface of a cover device, which is configured for attachment to an RF communication device installed on an interior surface of a wall of a structure or an interior surface of a window of a structure.

FIG. 4A illustrates a top view of display 402 mounted to a top surface of cover device 400, which is configured for attachment to an RF communication device 248 installed on an interior surface of a wall of a structure or an interior surface of a window of the structure. In one or more embodiments, cover device 400 may be configured to use display 402 for displaying to a user various types of content that may include one or more of status indicators, alerts, advertisements, graphics, designs, messages, emails, videos, pictures, wireless carrier information, or the like. One or more portions of the different types of displayed content may be controlled by one or more of a user, a technician, a wireless carrier, a beam management system, or an element management system.

Optionally, cover device 400 may include imaging component 406 for recording exterior view perspective images and/or videos that are then presented by display 402 for viewing by a user. Further, display 402 may be used for displaying one or more real time exterior views, including a mirrored view of an outwardly facing exterior perspective view based on the location of RF communication device 248 on an interior surface of a window or a wall inside a structure. In this way, the mirrored view can restore most of a view through a window for a user which was partially occluded by placement of RF communication device 248 on an interior surface of the window. Also, optionally in one or more embodiments, an infrared real time view may be displayed by display 402, which may include a mirrored view of an outwardly facing exterior "night time" perspective view.

Additionally, although not shown, cover device 400 may include a wireless communication interface for communicating with one or more UEs and/or the RF communication device.

Figure 4B:
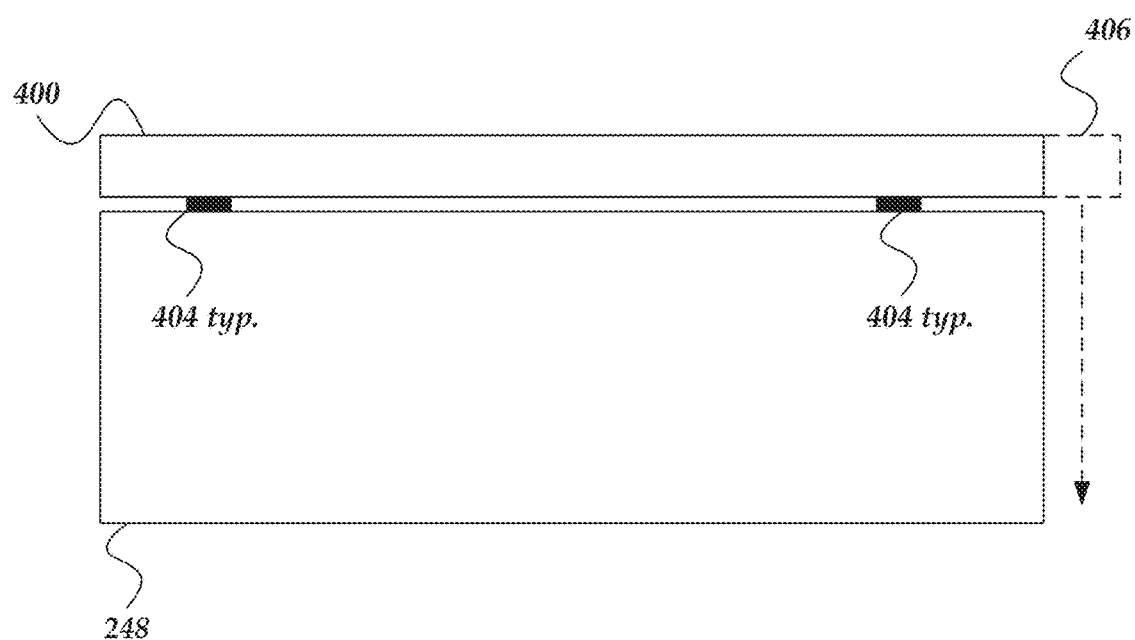
FIG. 4B shows a side view of a cover device, which includes one or more fasteners that are configured for attaching the cover device to a top surface of an RF communication device.

FIG. 4B shows a side view of cover device 400, which includes one or more fasteners 404 that are configured for attaching the cover device, by fasteners 404, to a top surface of RF communication device 248. In one or more embodiments, fasteners 404 may include one or more types of attachment elements, including: magnets, Velcro, adhesive tape, glue, epoxy, clips, bolts, screws, pins, clamps, or the like.

Generalized Operations

Figure 5A:
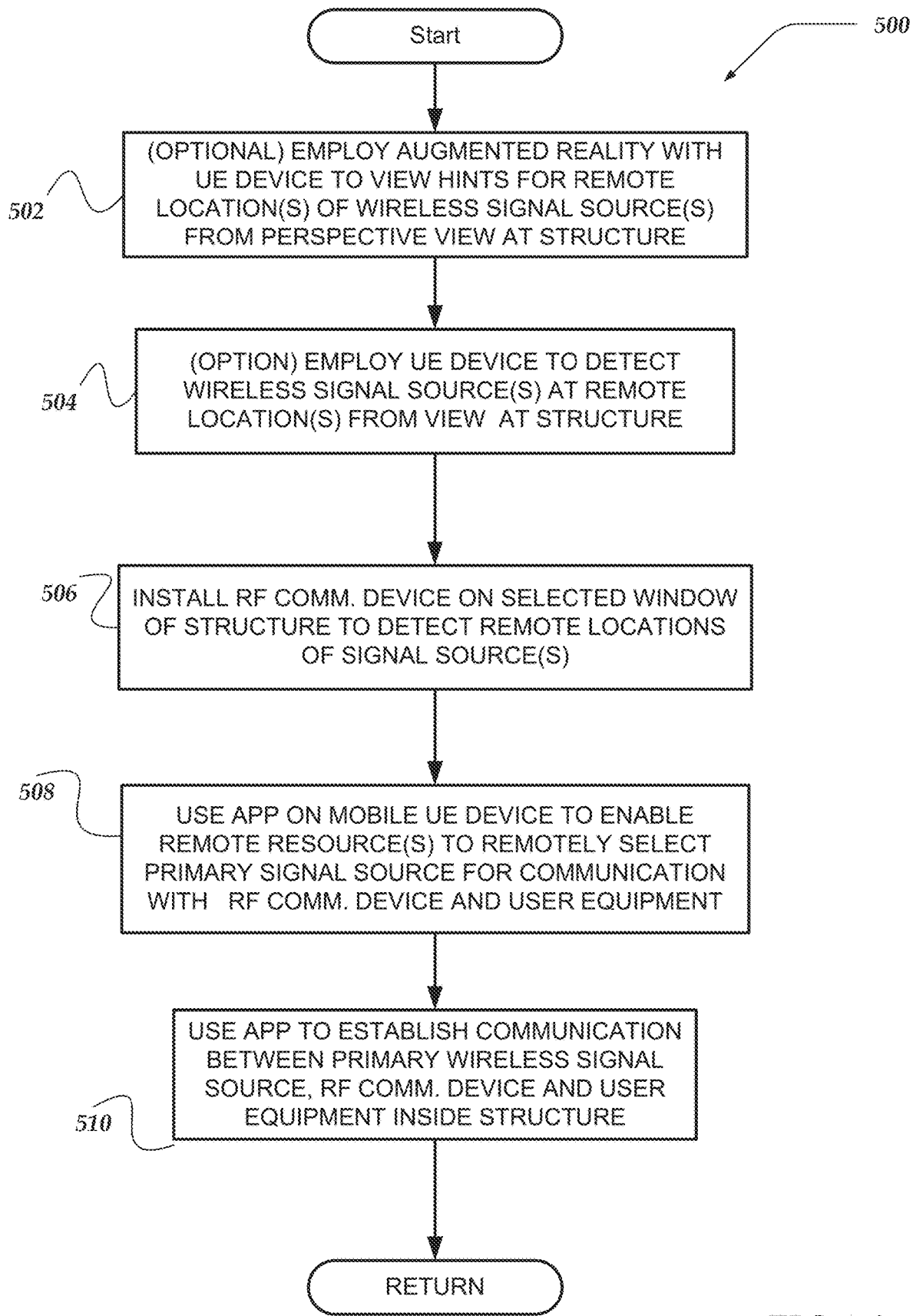
FIGS. 5A-5C illustrate flow charts for an application that enables a user and/or a professional installer to manage the installation and activation of an RF communication device and related equipment at a location, such as a premises of a customer.
Figure 5B:
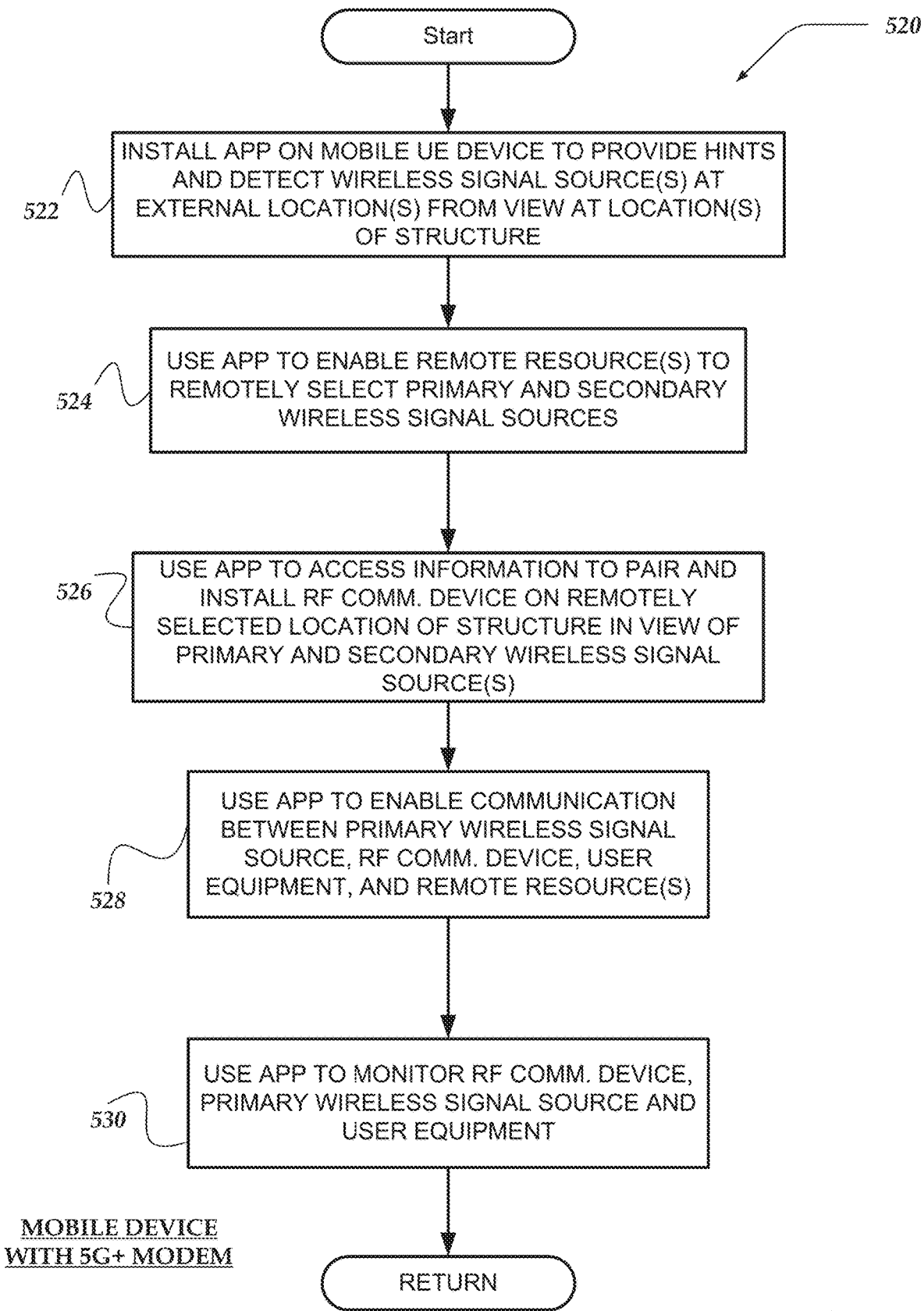
Figure 5C:
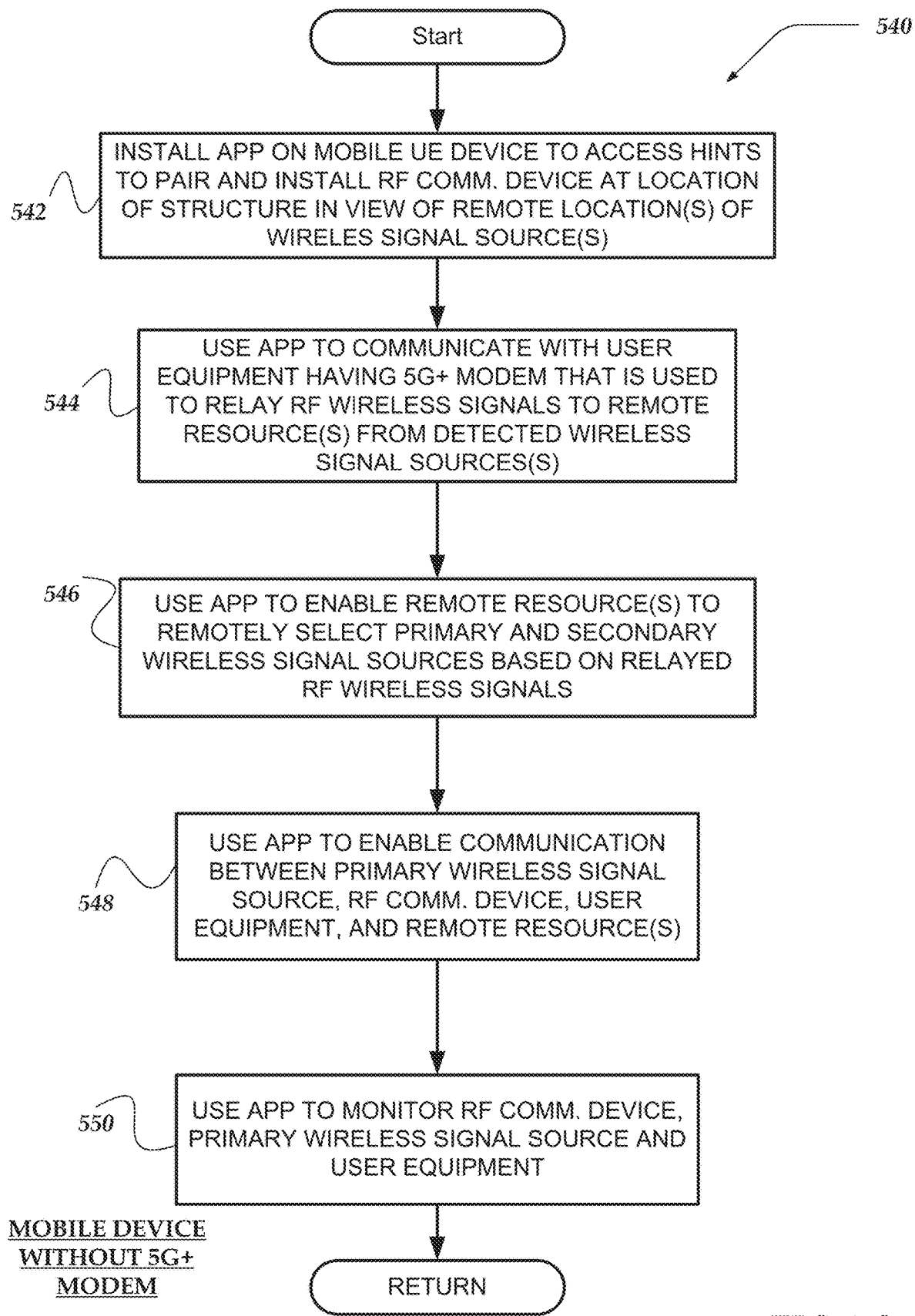

FIGS. 5A-5C illustrate logical flow diagrams for an exemplary method of employing an install and activation application executing on a wireless device, such as a mobile telecommunication device, that enables a technician and/or a customer/user to perform the installation and activation of an RF communication device at a location, such as a dwelling or any other structure. As shown, the install and activation application initially determines when at least wireless signals using 4G or higher communication protocols and Global Positioning System signals are detected at the user's location which are sufficient to enable installation and activation of the RF communication device and other UE devices such as a CPE. Next, the application can employ a combination of automated processes, videos, notifications, alerts, messages, visual cues, audio cues, and manual controls to enable the technician and/or user to install and activate the RF communication device at the user's location with minimal interaction with third parties, such as customer service provided by wireless carrier and/or the provider of the RF communication device and/or UE devices.

FIG. 5A illustrates an embodiment of a logical flow diagram for an exemplary method of general overview 500 of employing an application executing on a User Equipment (UE) device to facilitate installation and activation of an RF communication device at a structure that provides wireless communication between a wireless signal source associated with one or more wireless carriers and one or more UE devices located at the structure.

Moving from a start block, the process optionally steps to block 502 where an application is executed on a wireless UE device, e.g., a mobile telephone, to provide augmented reality information for potential remote locations of wireless signals sources in a display of a perspective exterior view through a structural opening in an exterior wall or a window. Further, the augmented reality information could display one or more hints or cues to the user for orientating a pose of the wireless UE device towards one or more potential locations of wireless signal sources defined by the augmented reality information.

Optionally, the process advances to block 504 where a wireless UE device, e.g., mobile telephone, is employed to detect wireless signal sources at one or more remote locations from a perspective view at the structure. An install and activation application executing on the UE device initially determines when at least wireless signals from one or more remotely located wireless signal sources using 4G or higher communication protocols and Global Positioning System signals are detected at the user's location which are sufficient to enable installation and activation of the RF communication device and other UE devices At block 506, the application executing on the wireless UE device is employed to communicate a particular location at the structure to install the RF communication device. The location may include a window, an opening in an exterior wall, an exterior surface of the structure's exterior walls, a mounting device attached to the exterior surface of the exterior wall, or a mounting device located outside and adjacent to the structure.

Next, at block 508, the application is employed to communicate with one or more remote resources, which determine and select a primary wireless signal source for communication with the RF communication device based on a variety of provided information and relayed RF signals. Also, the one or more remote resources may select a secondary wireless signal source as a backup in case of potential communication issues with the primary wireless signal source. The one or more remote resources may include an install and activation engine, element management systems engine, and a beam management systems engine.

Additionally, the RF communication device may be employed to scan a perspective view outward from the structure to receive RF signals radiated by one or more wireless signal sources from their respective remote locations. These received RF signals and/or related information may be relayed for evaluation to one or more remote sources, which can include one or more of an install and activation engine, an element management systems engine and a beam management systems engine. Once the primary wireless signal source is selected and corresponding location is known, the RF communication device can electronically adjust a shape and/or a direction of waveforms transmitted and received by the RF communication device's HMAs towards the location of the primary wireless signal source. Further, when the primary wireless signal source is communicating over frequencies having millimeter waveform wireless signals, the RF communication device may be arranged for the HMAs to communicate RF signals with beam shaped waveforms directed to a determined location of the primary wireless signal source. Alternatively, when the primary wireless signal source is communicating over frequencies with non-millimeter waveform wireless signals, the RF communication device may be arranged for the HMAs to communicate RF signals with sector waveforms towards the primary wireless signal source or with non-directional non-beam waveforms.

At block 510, the application is employed to establish communication between the primary wireless signal source, the installed RF communication device, and UE devices at the structure. Next, the process advances to the return block and performs other actions.

FIG. 5B shows an embodiment of a logical flow diagram for an exemplary method of general overview 520 for employing an install and activation application executing on a mobile User Equipment (UE) device which includes a modem that can communicate with 5G or higher (5G+) communication protocols to facilitate installation and activation of an RF communication device at a structure that provides wireless communication between a wireless signal source associated with one or more wireless carriers and one or more UE devices located at the structure.

Moving from a start block, the process advances to block 522 where the application provides hints to detect remotely located wireless signal sources from one or more views at one or more locations of a structure, which may include opposing or perpendicular sides of the structure. The application initially determines when at least wireless RF signals from one or more remotely located wireless signal sources using 4G or higher communication protocols and Global Positioning System signals are detected at the user's location which are sufficient to enable installation and activation of the RF communication device and other UE devices.

At block 524, the application is employed to communicate with one or more remote resources, which determine and select a primary wireless signal source for communication with the RF communication device based on a variety of provided information and relayed RF signals. Also, the one or more remote resources may select a secondary wireless signal source as a backup in case of potential communication issues with the primary wireless signal source. The one or more remote resources may include an install and activation engine, element management systems engine, and a beam management systems engine.

Moving to block 526, the application is employed to provide access to information used to install the RF communication device at a location in view of the primary wireless signal source and secondary wireless signal source. Also, the application may be used to pair the RF communication device with one or more UE devices at the structure.

Additionally, the RF communication device may be employed to scan a perspective view outward from the structure to receive RF signals radiated by one or more wireless signal sources from their respective remote locations. These received RF signals and/or related information may be relayed for evaluation by the one or more remote sources, which can include one or more of an install and activation engine, an element management systems engine and a beam management systems engine. Once the primary wireless signal source is selected and its corresponding location known, the RF communication device can electronically adjust a shape and/or a direction of waveforms transmitted and received by the RF communication device's HMAs towards the location of the primary wireless signal source. Further, when the primary wireless signal source is communicating over frequencies having millimeter waveform wireless signals, the RF communication device may be arranged for the HMAs to communicate RF signals with beam shaped waveforms directed to a determined location of the primary wireless signal source. Alternatively, when the primary wireless signal source is communicating over frequencies with non-millimeter waveform wireless signals, the RF communication device may be arranged for the HMAs to communicate RF signals with sector waveforms towards the primary wireless signal source or with non-directional non-beam waveforms.

At block 528, the application may be employed to establish communication between the primary wireless signal source, the installed RF communication device, the one or more remote resources, and one or more UE devices at the structure.

Stepping to block 530, the application may be employed to monitor the operation and arrangement of the RF communication device, the primary wireless signal source, and one or more UEs at the structure. Next, the process advances to the return block and performs other actions.

FIG. 5C illustrates an embodiment of a logical flow diagram for an exemplary method of general overview 540 for employing an install and activation application executing on a mobile User Equipment (UE) device which does not include a modem that can communicate with 5G or higher (5G+) communication protocols to facilitate installation and activation of an RF communication device at a structure that provides wireless communication between a wireless signal source associated with one or more wireless carriers and one or more UE devices located at the structure.

Moving from a start block, the process advances to block 542 where the application provides hints to detect remotely located wireless signal sources from one or more views at one or more locations of a structure, which may include opposing or perpendicular sides of the structure. The application initially determines when at least wireless RF signals from one or more remotely located wireless signal sources using 4G or higher communication protocols and Global Positioning System signals are detected at the user's location which are sufficient to enable installation and activation of the RF communication device and other UE devices. Also, the application provides hints on installing the RF communication device at a location of the structure in view of the one or more remotely located wireless signal sources. Also, the application may be used to pair the RF communication device with one or more UE devices at the structure.

At block 544, the application is employed to communicate with a UE device at the structure, which includes a modem that can communicate at 5G or higher (5G+) communication protocols. The application uses the 5G+ modem of the UE device to relay RF wireless signals to one or remote resources Moving to block 546, the application is employed to enable the one or more remote resources to remotely determine and select a primary wireless signal source for communication with the RF communication device based on a variety of provided information and relayed RF signals. Also, the one or more remote resources may select a secondary wireless signal source as a backup in case of potential communication issues with the primary wireless signal source. The one or more remote resources may include an install and activation engine, element management systems engine, and a beam management systems engine.

Additionally, the RF communication device may be employed to scan a perspective view outward from the structure to receive RF signals radiated by one or more wireless signal sources from their respective remote locations. These received RF signals and/or related information may be relayed for evaluation by the one or more remote sources, which can include one or more of an install and activation engine, an element management systems engine and a beam management systems engine. Once the primary wireless signal source is selected and its corresponding location known, the RF communication device can electronically adjust a shape and/or a direction of waveforms transmitted and received by the RF communication device's HMAs towards the location of the primary wireless signal source. Further, when the primary wireless signal source is communicating over frequencies having millimeter waveform wireless signals, the RF communication device may be arranged for the HMAs to communicate RF signals with beam shaped waveforms directed to a determined location of the primary wireless signal source. Alternatively, when the primary wireless signal source is communicating over frequencies with non-millimeter waveform wireless signals, the RF communication device may be arranged for the HMAs to communicate RF signals with sector waveforms towards the primary wireless signal source or with non-directional non-beam waveforms.

At block 548, the application may be employed to establish communication between the primary wireless signal source, the installed RF communication device, the one or more remote resources, and one or more UE devices at the structure.

Stepping to block 550, the application may be employed to monitor the operation and arrangement of the RF communication device, the primary wireless signal source, and one or more UEs at the structure. Next, the process advances to the return block and performs other actions.

Figure 5D:
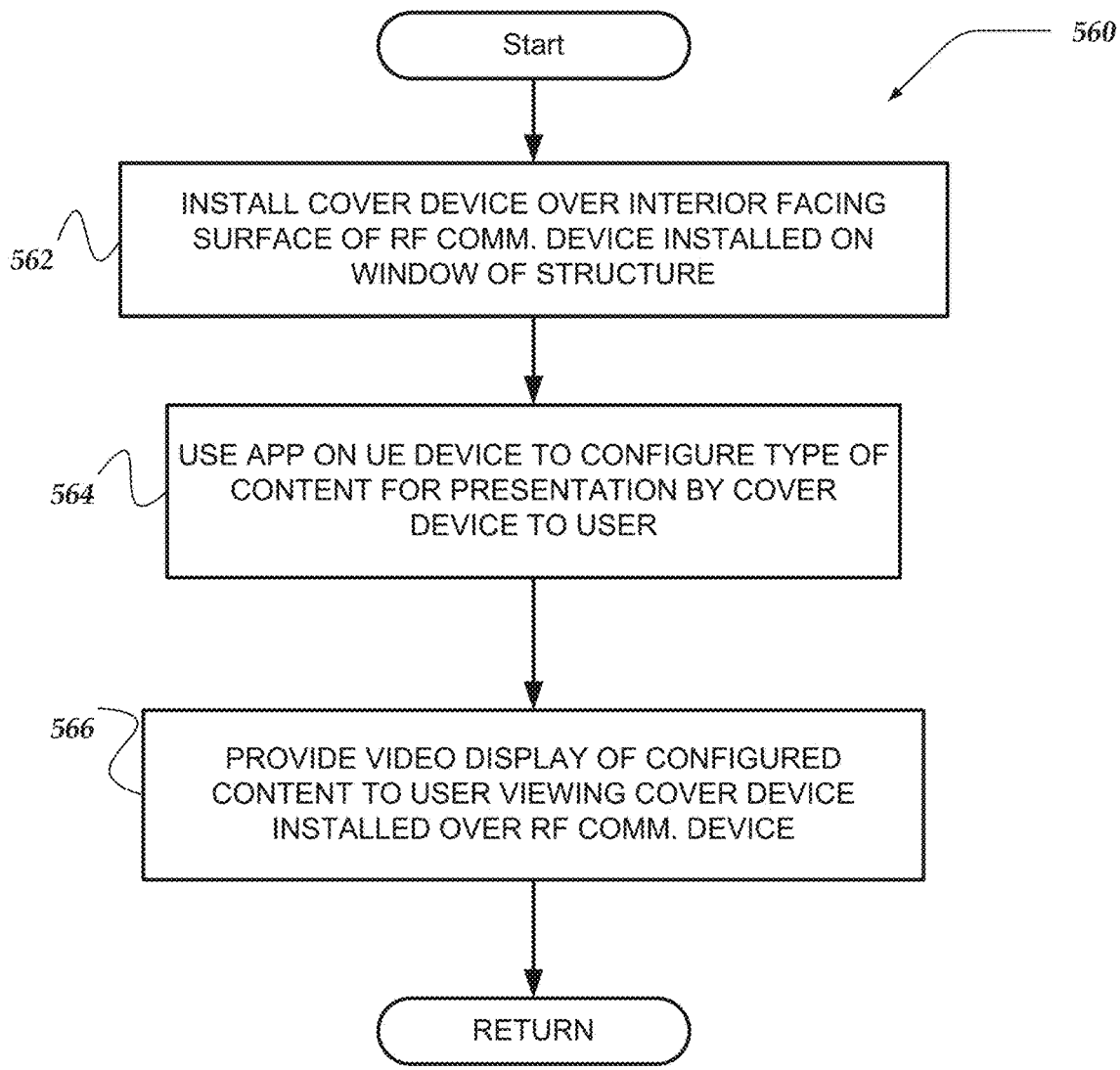
FIG. 5D shows an illustrative flow chart for installation and configuration for a cover device which is configured for attachment to an RF communication device installed on an interior surface of a structure.

FIG. 5D shows an embodiment of a logical flow diagram for an exemplary method of general overview 560 for installing and configuring a cover device for covering interior facing components of an RF communication device located on a window or an interior surface of an interior wall of a structure.

Moving from block 562, the cover device is installed over the interior facing surface(s) of components of an RF communication device that is installed on a window inside a structure.

Next, at block 564, an application executing on a UE device is employed to configure one or more different types of content to be displayed on a display for presentation to a user inside the structure. The different types of content may include one or more of status indicators, alerts, advertisements, graphics, designs, messages, emails, videos, pictures, wireless carrier information, or the like. Also, one or more portions of the different types of displayed content may be controlled by one or more of a user, a technician, a wireless carrier, an install and activation engine, a beam management systems engine, or an element management systems engine.

Optionally, the cover device may include an imaging component for recording exterior view perspective images and/or videos that are then presented by the cover device's display for viewing by a user. Further, the display may be used for displaying one or more real time exterior views, including a mirrored view of an outwardly facing exterior perspective view based on the location of RF communication device on an interior surface of a window or a wall inside a structure. In this way, the mirrored view can restore most of a view through a window for a user which was partially occluded by placement of the RF communication device on an interior surface of the window. Also, optionally in one or more embodiments, an infrared image or a video may be displayed, which may include a mirrored view of an outwardly facing exterior "night time" perspective view.

FIG. 6A illustrates a table that lists different colors and patterns that are used to provide visual cues as to the status of an RF communication device and/or UEs.

FIG. 6B shows a table that lists the operation of manual controls for an RF communication device and/or UE devices during installation/activation and regular usage.

Also, it will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for installing an RF communication device for communication of $5^{th}$ generation or higher generation (5G+) radio frequency (RF) signals between RF signal sources associated with one or more wireless carriers over one or more wireless networks and one or more user equipment (UE) devices, wherein one or more processors of a computing device execute instructions that perform actions, comprising:
   employing an application to provide information for installing the RF communication device on a surface of a selected location at a structure, wherein the selected location enables the RF communication device to detect 5G+RF signals radiated from one or more RF signal sources that are located outside the structure;
   employing the application to provide information related to the 5G+RF signals detected by the RF communication device to one or more remote resources;
   employing the one or more remote resources to select a primary 5G+RF signal source for communicating with the RF communication device based on the provided information, wherein the selected primary 5G+RF signal source is associated with a wireless carrier authorized for communication with a user;
   employing the application to use the RF communication device to establish a communication channel between a user of the one or more UE devices at the structure and the primary 5G+RF signal source associated with the wireless carrier that is authorized for communication with the user; and
   wherein execution of the application performs further actions that employ augmented reality information for one or more potential remote locations of one or more wireless signals sources in a display of a perspective exterior view through a structural opening in an exterior wall or a window.

2. The method of claim 1, further comprising:
   employing a mobile UE device having a 5G+modem to provide the information related to the detected 5G+RF signals to the one or more remote resources.

3. The method of claim 1, further comprising:
   employing a mobile UE device to use a 5G+modem provided by customer premises equipment to provide the information related to the detected 5G+RF signals to the one or more remote resources.

4. The method of claim 1, further comprising
   using the application to provide communication between the RF communication device and the primary 5G+signal source to the one or more remote resources and the mobile UE device.

5. The method of claim 1, wherein the selection of the location further comprises:
   providing a direct path for the RF communication device to detect the 5G+RF signals radiated by at least one 5G+RF signal source.

6. The method of claim 1, further comprising:
   determining that a 5G+RF signal source is reflecting other 5G+RF signals radiated by another 5G+RF signal source, wherein the reflecting 5G+RF signal source is selected as a secondary backup 5G+RF signal source.

7. The method of claim 1, wherein the one or more remote resources further comprise:
   providing a beam management system engine for the one or more wireless networks having an interne of things node architecture for communication of 5G+RF signals.

8. The method of claim 1, wherein employing the application further comprises:

pairing a mobile UE device with the RF communication device, wherein the pairing provides for the one or more remote resources to authorize the RF Communication device to communicate over the one or more wireless networks.

9. The method of claim 1, wherein employing the application, further comprises: using a mobile UE device to provide a location of the structure to the one or more remote resources based on Global Positioning System (GPS) signals detected by the mobile device, wherein the location is provided over one or more separate communication channels based on other out of band wireless RF signals.

10. The method of claim 1, wherein employing the application, further comprises one or more of:
providing to the user one or more ordered manual actions for troubleshooting installation of the RF communication device; or
contacting customer service to provide assistance to the user.

11. The method of claim 1, wherein using the application further comprises one or more of:
providing authentication of the user to the one or more remote resources;
providing authentication of the installation of the RF communication device to the one or more remote resources;
providing progress on the installation of the RF communication device to the one or more remote resources; or
in response to affirmative activation of the RF communication device, providing feedback information to the user.

12. A system for providing communication of $5^{th}$ generation or higher generation (5G+) radio frequency (RF) signals between RF signal sources associated with one or more wireless carriers over one or more wireless networks and one or more user equipment (UE) devices, comprising:
an RF communication device; and
a mobile UE device, including:
memory for storing an application; and
one or more processors for executing the application to perform actions;
providing information for installing the RF communication device on a surface of a selected location at a structure, wherein the selected location enables the RF communication device to detect 5G+RF signals radiated from one or more millimeter waveform RF signal sources that are located outside the structure;
providing information related to the 5G+RF signals detected by the RF communication device to one or more remote resources;
employing the one or more remote resources to select a primary 5G+RF signal source for communicating with the RF communication device based on the provided information, wherein the selected primary 5G+RF signal source is associated with a wireless carrier authorized for communication with a user;
using the RF communication device to establish a communication channel between a user of the one or more UE devices at the structure and the primary 5G+RF signal source associated with the wireless carrier that is authorized for communication with the user; and
wherein execution of the application performs further actions that employ augmented reality information for one or more potential remote locations of one or more wireless signals sources in a display of a perspective exterior view through a structural opening in an exterior wall or a window.

13. The system of claim 12, further comprising:
employing the mobile UE device having a 5G+modem to provide the information related to the detected 5G+RF signals to the one or more remote resources.

14. The system of claim 12, further comprising:
employing the mobile UE device to use a 5G+modem provided by customer premises equipment to provide the information related to the detected 5G+RF signals to the one or more remote resources.

15. The system of claim 12, further comprising using the application to provide communication between the RF communication device and the primary 5G+signal source to the one or more remote resources and the one or more UE devices.

16. The system of claim 12, wherein the selection of the location further comprises:
providing a direct path for the RF communication device to detect the 5G+RF signals radiated by at least one 5G+RF signal source.

17. The system of claim 12, further comprising:
determining that a 5G+RF signal source is reflecting other 5G+RF signals radiated by another 5G+RF signal source, wherein the reflecting 5G+RF signal source is selected as a secondary backup 5G+RF signal source.

18. The system of claim 12, wherein the one or more remote resources further comprise:
providing a beam management system engine for the one or more wireless networks having an interne of things node architecture for communication of 5G+RF signals.

19. The system of claim 12, wherein employing the application further comprises:
pairing the mobile UE device with the RF communication device, wherein the pairing provides for enabling the one or more remote resources to authorize the RF Communication device to communicate over the one or more wireless networks.

20. The system of claim 12, wherein employing the application, further comprises:
using the mobile UE device to provide a location of the structure to the one or more remote resources based on Global Positioning System (GPS) signals detected by the mobile UE device, wherein the location is provided over one or more separate communication channels based on other out of band wireless RF signals.

* * * * *